March 24, 1970 D. D. PRICE, JR., ET AL 3,501,851

METHOD AND APPARATUS FOR TEACHING

Filed July 11, 1967 10 Sheets-Sheet 1

INVENTORS
DAVID D. PRICE JR.,
WILLIAM B. HUCKABAY &
FORD C. PRICE
BY Dunlap and Laney
ATTORNEYS INVENTORS
DAVID D. PRICE JR.
WILLIAM B. HUCKABAY &
FORD C. PRICE
BY Dunlap and Laney
ATTORNEYS

METHOD AND APPARATUS FOR TEACHING

Filed July 11, 1967 10 Sheets-Sheet 3

INVENTORS
DAVID D. PRICE JR.
WILLIAM B. HUCKABAY &
BY FORD C. PRICE
Dunlap and Laney
ATTORNEYS March 24, 1970 D. D. PRICE, JR., ET AL 3,501,851

METHOD AND APPARATUS FOR TEACHING

Filed July 11, 1967

10 Sheets-Sheet 4

INVENTORS
DAVID D. PRICE JR.
WILLIAM B. HUCKABAY &
FORD C. PRICE

BY Dunlap and Laney
ATTORNEYS

March 24, 1970 D. D. PRICE, JR., ET AL 3,501,851

METHOD AND APPARATUS FOR TEACHING

Filed July 11, 1967 10 Sheets-Sheet 5

INVENTORS
DAVID D. PRICE JR.
WILLIAM B. HUCKABAY &
BY FORD C. PRICE
Dunlap and Laney
ATTORNEYS INVENTORS
DAVID D. PRICE JR.
WILLIAM B. HUCKABAY &
BY FORD C. PRICE
Dunlap and Laney
ATTORNEYS

METHOD AND APPARATUS FOR TEACHING

Filed July 11, 1967 10 Sheets-Sheet 7

INVENTORS
DAVID D. PRICE JR.
WILLIAM B. HUCKABAY &
BY FORD C. PRICE
Dunlap and Laney
ATTORNEYS March 24, 1970 D. D. PRICE, JR., ET AL 3,501,851

METHOD AND APPARATUS FOR TEACHING

Filed July 11, 1967 10 Sheets-Sheet 8

INVENTORS
DAVID D. PRICE JR.
WILLIAM B. HUCKABAY &
BY FORD C. PRICE

Dunlap and Laney
ATTORNEYS

INVENTORS
DAVID D. PRICE JR.
WILLIAM B. HUCKABAY &
BY FORD C. PRICE
Dunlap and Laney
ATTORNEYS.

INVENTORS
DAVID D. PRICE JR.,
WILLIAM B. HUCKABAY &
BY FORD C. PRICE

Dunlap and Laney
ATTORNEYS

United States Patent Office 3,501,851

Patented Mar. 24, 1970

3,501,851

METHOD AND APPARATUS FOR TEACHING

David D. Price, Jr., Oklahoma City, Okla., William B. Huckabay, Dallas, Tex., and Ford C. Price, Oklahoma City, Okla.; said Huckabay assignor to The Economy Company, Oklahoma City, Okla., a corporation of Oklahoma; and said David D. Price, Jr., and said Ford C. Price assignors to Individualized Instruction Incorporated, Oklahoma City, Okla., a corporation of Oklahoma Filed July 11, 1967, Ser. No. 652,575
Int. Cl. G09b 7/04
U.S. Cl. 35—9 31 Claims

ABSTRACT OF THE DISCLOSURE

A method and apparatus for reproducing plural track information as exemplified in a tutoring apparatus which is capable of reacting to student responses to branch or alter the tutoring program accordingly; the apparatus provides plural channels of coordinated visual and aural data of varying complexity for the students' consideration, and a response mechanism derives the students' answer and behavior relative to a given visual and/or aural lesson unit so that it can thereafter be evaluated in accordance with a predetermined code program to determine the next one of the possible visual and aural lesson units that will be presented to the student.

BACKGROUND OF THE INVENTION

Field of the invention

The invention relates generally to teaching machines and, more particularly, but not by way of limitation, it relates to an improved type of teaching apparatus which is capable of reacting to the student's response by varying the presentation of additional informative data accordingly.

Description of the prior art

The prior art includes various types of teaching machines of the audio-visual type. In its simple form, this type of mechanism is the talking motion picture as it is used to convey educational material, and it may include mechanisms for evoking a student response to specific questions to thereby grade or classify the students. Advances in the art have given rise to related types of audio-visual teaching machines wherein active control of the teaching apparatus is effected in response to a student's answers; that is, the lesson advance is directly controlled in response to answer registering devices. Still other devices can be generally classified as passive types which consist merely of registration apparatus wherein synchronized aural and/or visual information is offered for a student's consideration and an accurate record of his response is kept for comparison, automatic scoring, etc.

SUMMARY OF THE INVENTION

The present invention contemplates a teaching machine which is capable of reacting to a student's response to alter the pattern and subject matter of the immediately following tutorial materials; that is, an information presentation in the form of a chain or series of facts may be presented in a predetermined manner, but various other parallel branches of these patterns exist and may be selected in accordance with the student's response. In a more limited aspect, the invention utilizes a plurality of reproductions of visual material and a plural track aural record for each lesson or course of informative material. The lesson material, both aural and visual, can be presented in a predetermined manner and the student's response to given queries or tasks is compared with various predetermined possible responses so that the course or pattern of teaching can be varied accordingly. Thus, of the plural audio record tracks, one track may be prerecorded at a high speed and then played back at that speed in response to a series of correct response situations to quickly progress through a length of tape containing a block of information; however, an incorrect response at a selected decision point might alter the lesson course to a different record track which is prerecorded at a reduced speed for playback at that speed to present a characteristically different information program.

The apparatus consists of visual display apparatus and audio playback apparatus for presenting the coordinated visual and aural parts of the presentation. A program control device is employed to coordinate the audio and visual parts of the system in accordance with code information which is separately derived for each individual reproduction of visual information. The student response selector generates predetermined input data to an examination control device, which is also controlled in accordance with the predetermined code information attendant each reproduction, such that a response evalution is supplied to the program control device and it controls the visual display and audio playback apparatus to effect the next segment of lesson information.

Therefore, it is an object of the present invention to provide a tutoring machine which effectively reacts to a student's response and alters the instructional program in a predetermined manner.

It is also an object of the invention to provide such an active teaching machine which is capable of presenting lesson material to students of widely varying intellect or learning ability and to accurately evaluate a specified student's behavior relative to the presented information.

It is a further object of the present invention to provide a teaching machine which is capable of presenting information to a student from a branching pattern in accordance with the student's ability to correctly answer questions relating to the information.

It is a still further object of the present invention to provide branching toward more difficult and less difficult information presentations in response to the evaluation of one or more student responses.

It is yet another object of the invention to provide a teaching machine which presents aural and visual lesson information for a student's consideration, which machine plays back audio-uni-directionally from a selected record track at one of several record speeds to effect advantageous conservation of record space relative to the amount of information or block of material contained.

Finally, it is an object of the present invention to provide a tutoring machine which gives ample benefit to students of varying ability without penalizing the more gifted student through presentation of already mastered information and skills and a consequent waste of time.

Other objects and advantages of the invention will be evident from the following detailed description when read in conjunction with the accompanying drawings which illustrate the invention.

BRIEF DESCRIPTION OF THE DRAWINGS

FIG. 18 is a block diagram of a recording test indicator with visual display which may be employed with the present invention.

DESCRIPTION OF THE PREFERRED EMBODIMENT

Figure 1:
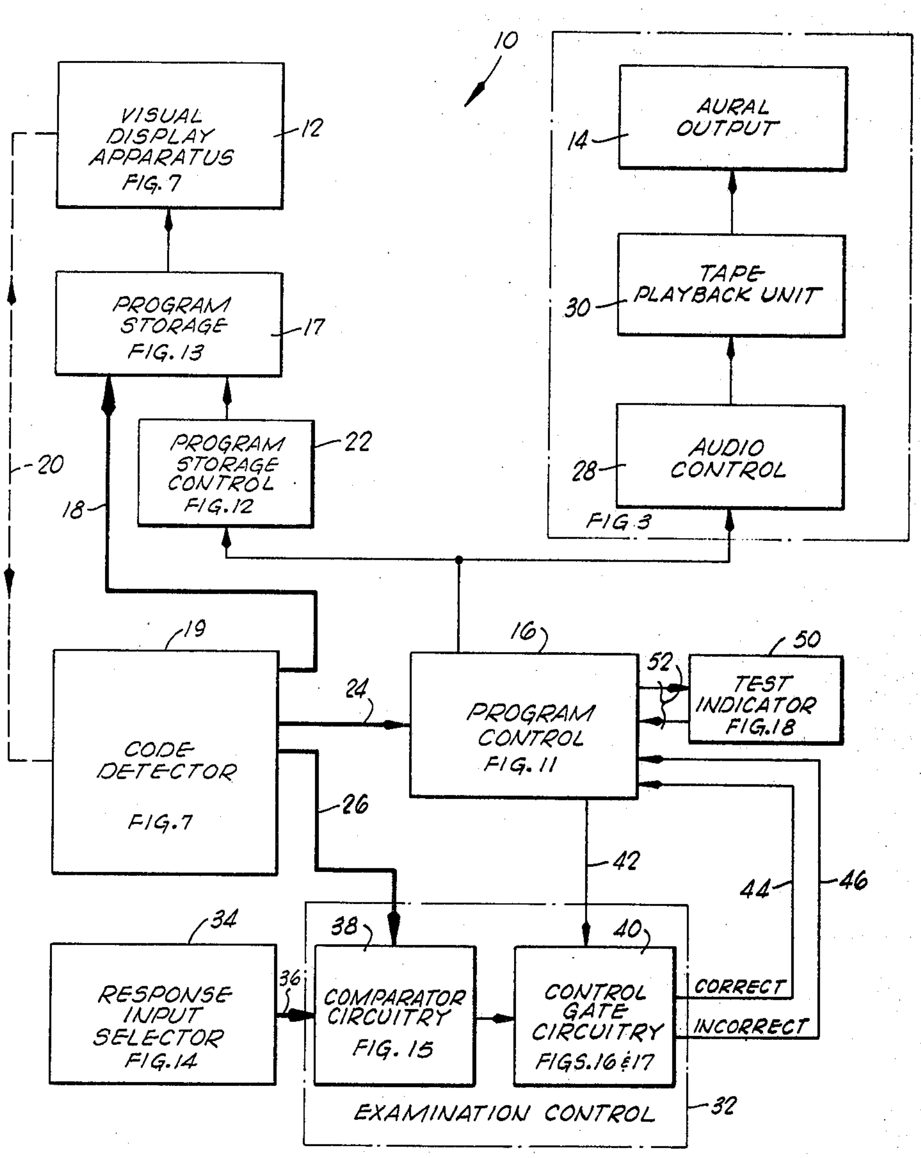
FIG. 1 is a block diagram of the present invention.

Referring now to FIG. 1, the teaching machine 10 comprises a visual display appartus 12 and a related aural output 14 which are controlled by various control assemblies functioning through a program control 16. more specifically, the visual display apparatus 12 is controlled directly in response to a program storage 17 to display a predetermined visual reproduction. The particular reproduction is placed in program storage 17 via a plurality of code inputs on multi-lead cable 18 from a code detector 19. Code detector 19 derives various code indications, binary or otherwise, as will be further described, from the visual display apparatus 12 (as designated by the dash line 20), and it may constitute a part of display apparatus 12. The program storage 17 is then actuated by a program storage control 22 in response to program control 16 such that the stored program is released and the proper visual indicia is displayed in visual display apparatus 12.

Code detector 19 provides still further code indication outputs via multi-lead cables 24 and 26. Code output 24 is supplied to program control 16 and further outputs are applied to an audio control stage 28 which controls the operation of a tape playback unit 30, a variable speed, plural track recording and playback mechanism. The selected output from tape playback 30 is then processed through the aural output circuitry 14 to provide the sound portion of the teaching information.

An examination control unit 32 provides an evaluation as between the presentation of visual and aural information and a student's response thereto. Thus, the student in attendance can actively participate by means of a response input selector unit 34 which is employed to enable various student responses for input via a multi-lead cable 36 to examination control 32. The examination control 32 is made up of comparator circuitry 38 which receives still additional code inputs from code detector 19 via cable 26 for comparison with student response inputs on cable 36. The output from comparator circuitry 38 is applied to control gate circuitry 40 which operates in response to control input via connection 42 from program control 16 to provide "corrrect/incorrect" output indications for conduction lines 44 and 46 back to the program control 16. Thus, as will become apparent, there is a great amount of interaction of function between the examination control 32, program control 16 and related code circuitry. A test indicator 50 which preferably includes a paper recorder is connected to receive preselected indications via interconnections 52 from program control 16 for the purpose of scoring student responses and assuring the order and integrity of an examining operation.

The following description proceeds with reference to individual units or subsystems of the FIG. 1 apparatus. These units are constituted largely of conventional types of logic circuitry, gating devices, comparators, flip-flop stages, etc., and unless otherwise noted the various stages may be selected from the commercially available types. For purposes of this description, flip-flop orientation is such that common or ground potential is the "1" or conductive state. Also, it should be understood that no particular reference is made to the operating console and form of the overall chassis construction, this being a matter of design which will vary in accordance with student requirements and installation exigencies.

Figure 2:
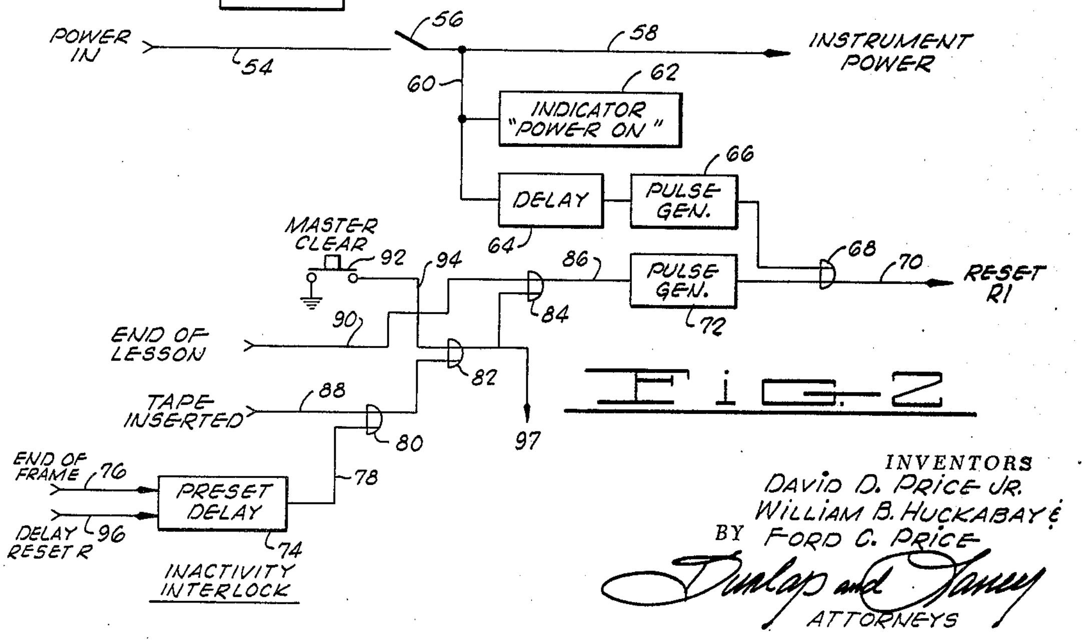
FIG. 2 is a schematic diagram of the power application circuitry of the present invention.

FIG. 2 shows the main power circuitry for the system of FIG. 1. Primary energizing power is applied on lead 54 whereupon main power switch 56 enables instrument power to the system via lead 58 and lead 60 provides a source for resetting various bi-stable circuits throughout the teaching machine 10. This source energizes an indicator lamp 62 which denotes "power-on" and, simultaneously, it energizes a delay circuit 64, i.e., a conventional type of mono-stable multibivrator, which actuates pulse generator 66 to provide a pulse output to OR gate 68. The OR gate 68 then provides an output via lead 70 which serves as a "reset No. 1" or R1 output and this is applied to reset various bi-stable devices throughout teaching machine 10 as will be further described.

The reset output from OR gate 68 is also present upon energization of pulse generator 72 in response to various limiting and interlocking functions. Thus, an inactivity interlock, preset counter delay 74, is energized by an "end of frame" input pulse on input 76 (to be further described) to conduct an output pulse after the preset delay on lead 78 through OR gate 80, OR gate 82 and OR gate 84 for application on lead 86 to trigger the pulse generator 72 thereby effecting reset pulse or R1 output on lead 70. An additional interlock (not shown) is energized when the tape is inserted to provide an input on lead 88 through OR gates 80, 82 and 84, thus also energizing pulse generator 72 to provide reset output through OR gate 68. Similarly, the "end of lesson" response (to be described) is conducted via input 90 through OR gate 84 to effect the same reset energization while "master clear" can be effected by closing the manual push-button switch 92 to provide energizing input via lead 94 through OR gates 82 and 84 to pulse generator 72. The preset time delay 74 is reset via a reset R pulse received at input 96 in response to turning on of the tape playback drive as will be further described below. Output 97, to playback drive circuitry (FIG. 18 to be described), results from actuation of OR gate 82 which is activated from inactivity interlock, tape inserted, or "master clear" signals.

Figure 3:
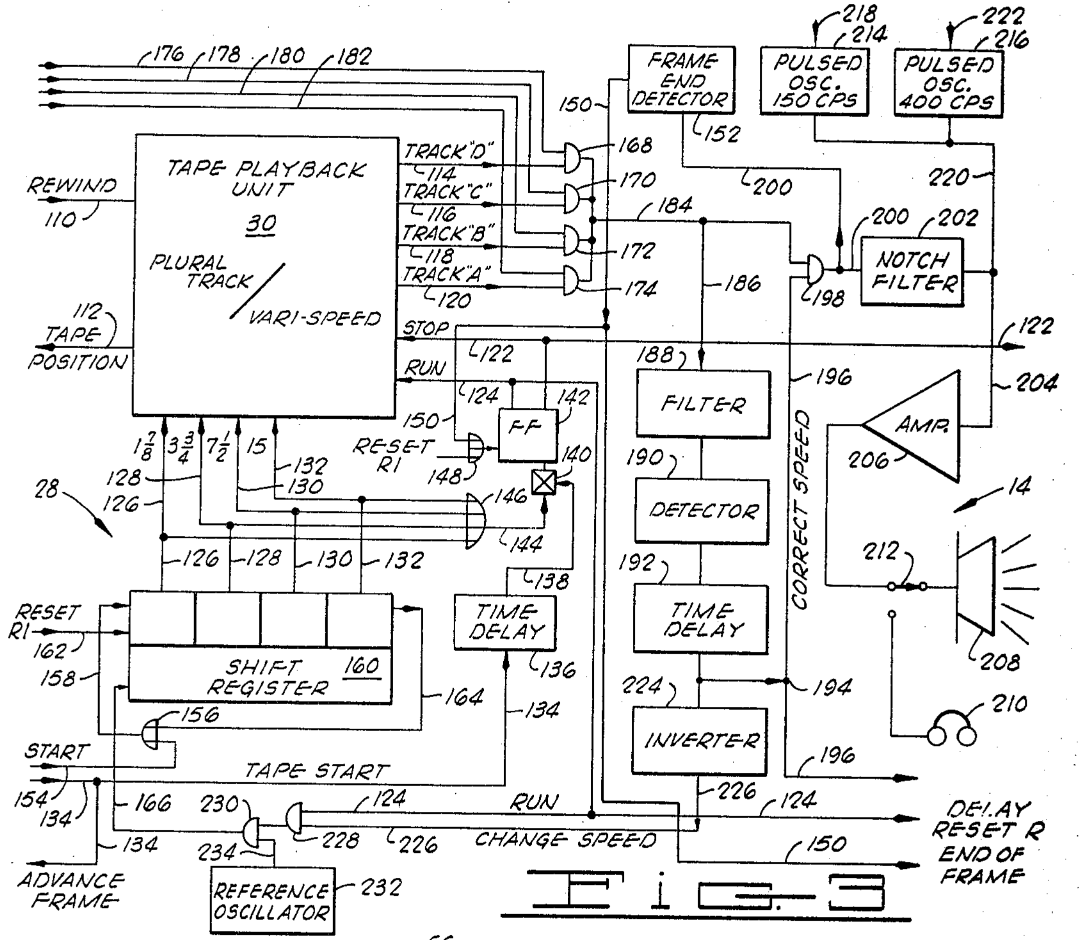
FIG. 3 is a partial schematic diagram of the audio section including audio control and the audible output circuitry.
Figure 4:
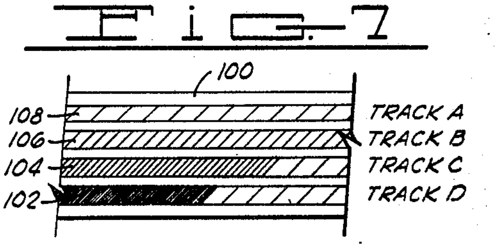
FIG. 4 is a schematic representation of a section of audio tape of a type which may be employed in the present invention.

FIG. 3 illustrates the tape playback unit 30 and the audio control ciircuitry 28 in greater detail. Tape playback unit 30 is a variable speed playback unit having plural track playback capability. Thus, as shown in FIG. 3, the playback unit 30 has plural playback heads (not shown) aligned with each of the plural record tracks A, B, C and D which may be placed in juxtaposition along a single recording tape. FIG. 4 shows a section of tape 100 having separate record tracks 102, 104, 106 and 108 disposed therealong for receiving the separate tracks of record information. It is proposed in the present invention that each of the record tracks may be recorded at different record speeds, e.g. the respective record tracks 102 through 108 can be recorded at tape transport speeds of 1⅞, 3¾, 7½, and 15 inches per second, respectively, thus to enable progressively varying information content per record area as between the various tracks. Each of record tracks 102–108 also has a constant frequency reference signal recorded thereon to enable correct speed detection (as will be described)), and signal bursts or pulses designating the end of a lesson frame are placed periodically along each record track. The constant frequency reference signal may be varied as to the frequency for selected segments along a particular record track such that variable speed capability is available for each separate one of record tracks 102–108.

Thus, for a given extent of tape, the first record track 108 may be recorded at a faster rate with, for example, one information unit or lesson frame and each of the progressively slower speed record tracks 106, 104 and 102 may be recorded to contain increasing numbers of lesson frames which constitute an approximate information equivalent of the track 108 unit. Periodic frame end points common to adjacent tracks may then be designated as decision or branching points in the program of the correlated audio and visual material. Control of playback speed is provided in response to a reference signal of a given frequency whereby different record tracks can be moved at different tape speeds to some subsequent frame end of decision point as will be further described.

A tape recorder and playback equipment which is suitable for use as tape playback 30 is commercially available Model No. 6104 which is manufactured by Precision Instruments, Inc. of Palo Alto, Calif., and which can be modified in conventional manner to deliver the desired tape speeds and to allow for electronic, remote control tape speed shifting. The tape playback 30 receives a "rewind" pulse on lead 110 from the program control unit 16 (to be described) while supplying a "tape position" pulse on return lead 112 to the same unit. Audio output from respective record tracks D through A is provided on leads 114, 116, 118 and 120 and a pulse applied to one of leads 126, 128, 130 or 132 will provide tape drive speed selection.

A "tape start" signal is received on lead 134, as generated in the program control 16 (to be described), and applied to a time relay 136. Time delay 136 provides a brief delay to allow clearing of the associated bistable circuits and it is then actuated to provide an output on lead 138 to an input gate or interlock 140, e.g., a diode-capacitor-diode gate, of flip-flop 142. A level set input to enable the input gate 140 is provided via lead 144 from OR gate 146 which conducts a pulse indication present on one of leads 126–132, depending upon which record speed is being energized. Thus, when flip-flop 142 is actuated by application of the "tape start" signal on lead 138, flip-flop 142 switches from its one to its zero state whereupon pulse output on lead 124 provides "run" signal input to the playback unit 30. Simultaneously, "stop" signal input on lead 122 is removed. Flip-flop 142 can be reset by means of OR gate 148 which conducts either an R1 pulse as generated in power equipment of FIG. 2, or a "frame-end" pulse which is present on lead 150 from the frame end detector 152. Frame end detector 152 generates a pulse in response to the recorded frame signal indication present at specified points along each record track to denote the end of a lesson unit or frame of aural data.

Upon first energizing the tape playback unit 30, the lesson may be started, for example, at the 1⅞ i.p.s. speed so that an initial series of test frames can be run to determine the student's capability with a least expenditure of the recording tape. Thus, a "start" signal which is present on input lead 154 from program control 16 (to be described) is applied through an OR gate 156 for input via lead 158 to set the first stage of a shift register 160. Shift register 160 is a conventional form of 4-bit register which may be reset by R1 pulses applied on reset lead 162 and the register is set by means of the input on lead 158. Thus, a set can result from either a "start" pulse on lead 154 through OR gate 156, or by a shift cycle pulse which is conducted from the last stage of shift register 160 via lead 164 through OR gate 156, etc. Register 160 may be shifted by a shift pulse applied on input lead 166 to effect tape speed control as will be described below.

Upon initial energization, shift register 160 is actuated such that its first position is switched to its one output whereby lead 126 provides an output to the tape playback unit 30. Therefore, initial energization will start the tape unit 30 on the 1⅞ inches per second tape speed. The outputs from the different record tracks D–A on leads 114–120 are provided to respective AND gates 168, 170, 172 and 174 and one of these is enabled by a track selection output on respective leads 176, 178, 180 and 182 from program control 16 to allow output on the common audio output lead 184.

Only one of AND gates 168–174 may be enabled at one time. The enabled audio output on lead 184 includes the constant frequency reference signal which is selectively conducted via lead 186 through a narrow pass-band filter 188, detector 190 and a time delay 192 to develop a correct speed voltage at junction 194. The filter 188 is a narrow pass-band filter which is tuned to accept the reference signal modulated on the particular track A–D, whichever is energized at that particular time. The "correct speed" signal from junction 194 is then applied via lead 196 to enable AND gtae 198 to conduct the audio output present on lead 184 onto its output lead 200.

The audio ouput on lead 200 is connected to the frame end detector 152, to detect a "frame end" tone as previously described, and the audio output (lead 200) is also passed through a notch filter 202 which removes all control signals and allows only the recorded aural message to proceed via lead 204 to amplifier 206 for presentation to the student by means of loud speaker 208 or ear phones 210, depending upon the position of a selector switch 212.

A pair of pulsed oscillators 214 and 216 are provided to supply right and wrong tones to the student as a reinforcement measure. Pulsed oscillator 214 is designed to oscillate, e.g., at 150 cycles per second, when pulsed by a "right" pulse actuation on lead 218 from control unit 16 (to be described) to provide an output tone on lead 220 for application through amplifier 206 and the audio output device, loud speaker 208 or ear phones 210. Similarly, oscillator 216 is pulsed by a "wrong" pulse indication applied at input 222 and also derived from program control 16 to provide an output pulse of a 400 cycle or different tone for similar audible presentation.

In the event that the designated one of tracks A–D is changed by the program control unit 16 (FIG. 1), the enabling input on one of leads 176–182 may no longer coincide with the track audio outputs on the respective leads 114–120 to AND gates 168–174 and, therefore, no output will be present on lead 184 and no "correct" speed signal will be present at junction 194. With no signal present at junction 194, an inverter stage 224, having its input connected to the junction 194, conducts a "change speed" signal via lead 226 for input to AND gate 228. AND gate 228 is enabled by a "run" input on lead 124 from flip-flop 142.

The output from AND gate 228 is conducted to enable an AND gate 230 which allows passage of output pulses from a reference oscillator 232 as applied in on lead 234. The output from AND gate 230 is then present on lead 166 as the shift pulse input to shift register 160. Oscillator 232 may be a conventional pulse oscillator operating at, for example, 10 c.p.s. This shift pulse input on lead 166 serves to actuate the shift register 160 such that successive tape speed outputs 126–132 are enabled during what may be termed a search period of the change speed operation. Speed change is finally effected when the shift register 160 is stopped as a matching record track tone is obtained through filter 188 and detector 190 from the output 184 to produce a "correct speed" signal at junction 194.

Figure 5:
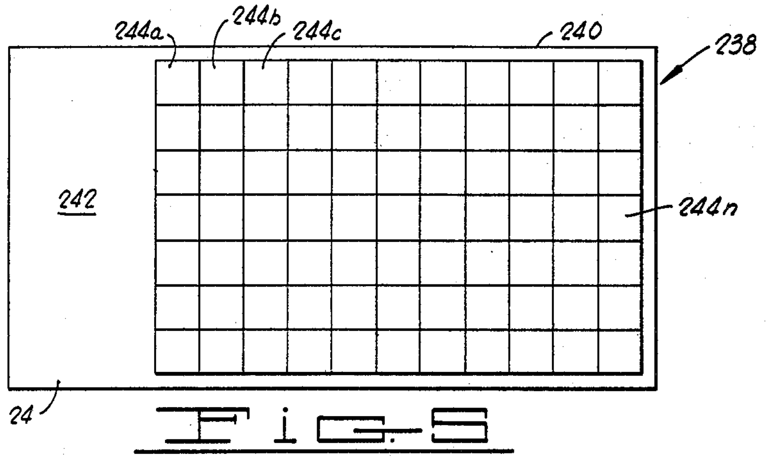
FIG. 5 depicts a microfiche which may be employed to carry a visual information record, a plurality of positive film reproductions.

FIG. 5 shows one form of visual record which may be employed in the teaching machine 10. FIG. 5 represents what is known as a microfiche which consists mainly of a card-type of body member 240 which is adapted to contain various units of visual and other instructive material. That is, a blank portion 242 at one side may carry printed matter pertaining to specific lesson instructions, synopsis of lesson material, etc. The remaining and major portion of the card member 240 carries a plurality of microphoto frames 244, each of these frames 244*a, b, c . . . n* presenting specific visual material in the form of photographic transparencies or such and including coding information applicable to each frame.

Figure 6:
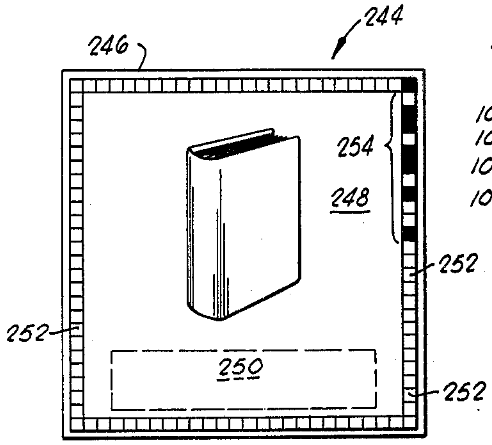
FIG. 6 is an enlarged showing of a single photo section of FIG. 5.

FIG. 6 shows an enlargement of a single photo frame 244 with an example of visual information and coding content. Thus, each of photos 244 is bounded by a framing or separating strip 246, which may merely constitute the supporting portion of card member 240 that must be employed to support each of photos 244, and this may be an opaque substance to aid in delineation of the projected visual material. A photographic positive or such may be in the central portion 248 and this will contain visual information for projection to the student's view. A designated portion such as 250 might be employed to write out lesson information, specific questions about the visual information, etc.

The coding arrangement for each frame or photo 244 consists of a series of squares 252 arranged around the outer limits of the light transmitting portion 248 of photo 244. In one form of the invention it is proposed that each photo 244 have one hundred such coding squares 252 equi-spaced about its outer edge as shown in FIG. 6, twenty-five coding squares 252 being situated on each side of photo 244. The squares 252 are then made either opaque or transparent and utilized in binary combinations and single on-off indications to convey the coding information as will be further described below. The group 254 of code squares 252 show an example of such binary indication. It should be understood that this is merely one form of coding device, and that many conventional devices may be included in the present scheme. For example, design considerations may require that the system coding functions be modulated on the pre-existing audio lesson tracks 102–108 (FIG. 4) or upon a separate audio record track.

Figure 7:
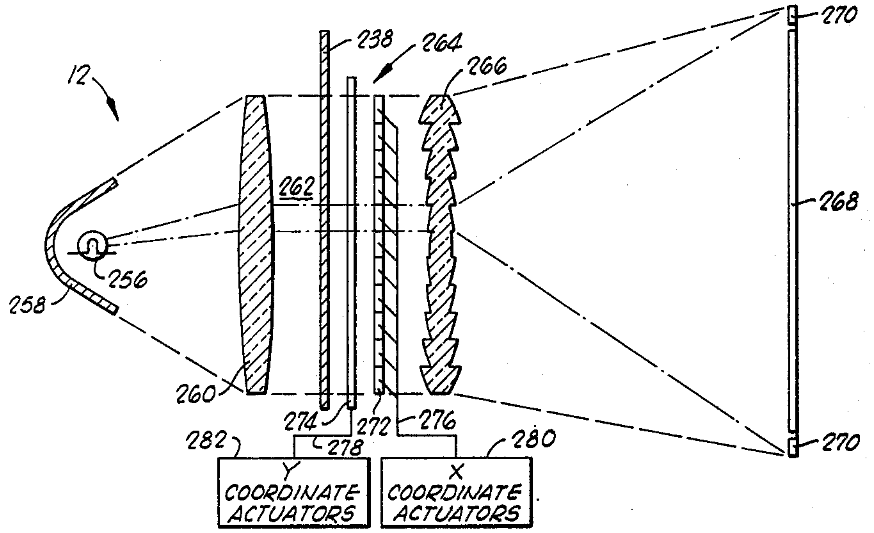
FIG. 7 is a pictorial top view of one form of visual display apparatus which may be employed in the present invention.

FIG. 7 shows a form of visual display apparatus which may be employed to present selected photos 244 of visual information to the student's view. Display apparatus 12 consists of a projection lamp 256 of suitable high intensity and a baffle or such as reflector 258 for insuring maximum utilization of the light. The illumination is first channeled by a collimating lens 260 whereupon the generally parallel light rays 262 are passed through the microfiche 238 to a shuttering mechanism 264. A coordinate projection lens 266 serves to focus any selected individual photo 244 of visual information from microfiche 238 upon a front display screen 268.

The shuttering mechanism 264 is comprised of two series of shutters arranged in perpendicular alignments, an X shutter series 272 and an oppositely oriented Y shutter series 274, one each of the respective X and Y shutter members being actuable by means of respective linkages 276 and 278 connected to be operated by the X coordinate actuators 280 and the Y coordinate actuators 282. The selection of the respective X and Y actuation is determined in the visual control unit 18 (FIG. 1) in accordance with conventional matrix practices as will be further described below. The selection of an X column and Y row determines which microfiche frame 244 is projected through the coordinate projection lens 266.

Figures 8A, 8C, 10A, 10B, 10C:
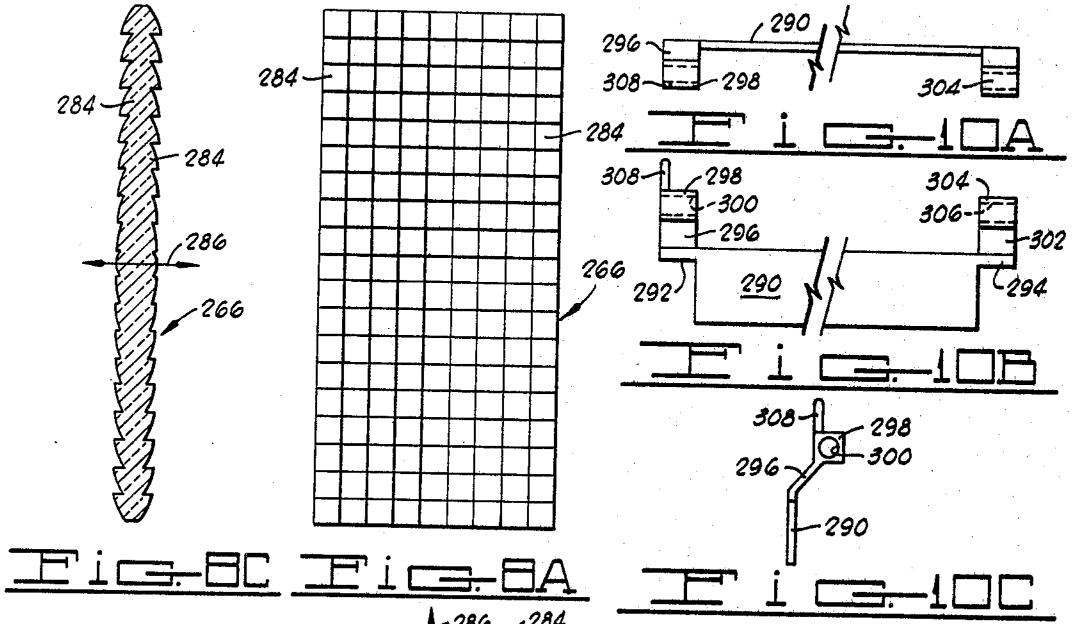
FIGS. 8A, 8B and 8C illustrate a front view and two sectional views of a display lens which may be employed in the apparatus of FIG. 7.
FIGS. 10A, 10B and 10C illustrate a side view, front view and end view, respectively, of a shutter which may be employed in the apparatus of FIGS. 7 and 9.

The projection lens 266 is designed to have a separate projecting optics aligned with each coordinate light passage of shuttering apparatus 264 and, therefore, each photo 244 of microfiche 238. FIG. 8A shows one form of projection lens 266 in front view. In this particular illustration the lens 266 is divided into 171 square or rectangular optical units 284 (9×19) which may be selected to be the same number that the associated shutter system and microfiche contain. Each of the optic units 284 is then individually shaped in accordance with its distance and polar orientation relative to the center or optical axis 286 of the objective lens 266.

Figure 8B:
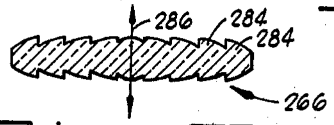

Thus, as shown in FIG. 8B the short dimension of objective lens 266 is formed to have the opposite optical interfaces or lens surfaces of each optical unit 284 disposed at gradually increasing angles relative to the optical axis 286 and, referring to FIG. 8C, the similar increasing angles can be noted in a section through the long dimension of objective lens 266. That is, as the optical units 284 are increasingly displaced from the optical axis 286, the angle of the optical interface is progressively increased. Each optical unit 284 is, in effect, an assymmetrical lens for projection of a given coordinate position onto the full area of display screen 268 (FIG. 7).

Figure 9:
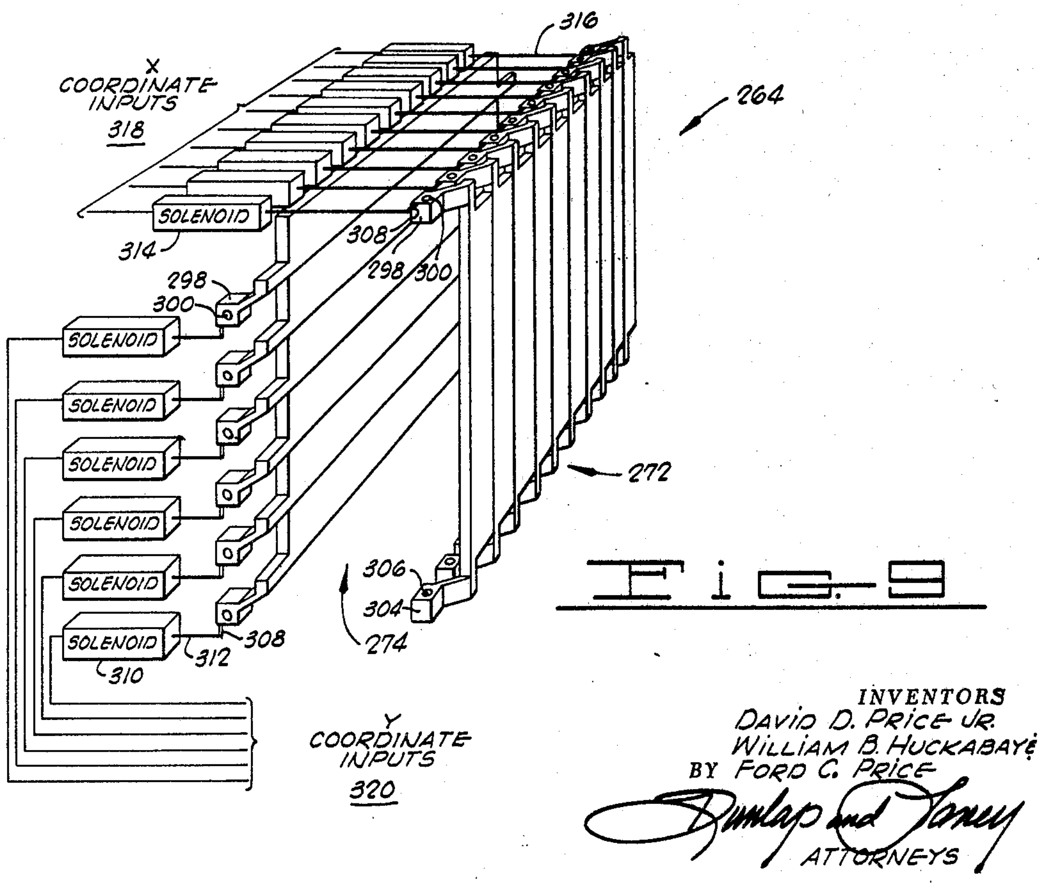
FIG. 9 is a diagrammatic illustration of one form of complete $x$–$y$ coordinate shutter mechanism with associated solenoid circuits which may be employed in the FIG. 7 apparatus.

FIG. 9 shows one form of shuttering mechanism 264 which may be employed in the visual display apparatus of FIG. 7. Each of the X shutters 272 and Y shutters 274 may be of similar construction although of different lengths as dictated by the designed dimensions of the display apparatus and microfiche. Such a shutter is shown in FIGS. 10A, B and C wherein a shutter blade 290 is formed to have end extensions 292 and 294 formed thereon in linear relationship to one edge of shutter blade 290. The end extension 292 is then formed to have an arm portion 296 extending at an acute angle from the plane of shutter blade 290. A bushing member 298 having guide hole 300 is formed on arm portion 296. Similarly, the other end of shutter blade 290 is formed to have a rotary securing point consisting of arm portion 302, bushing member 304 and guide hole 306. A small lever arm 308 is formed on bushing member 298 generally parallel to shutter blade 290 to serve as an actuating lever.

Referring again to FIG. 9, each of the X shutters 272 and the Y coordinate shutters 274 are arranged in their respective planes in total light blocking relationship. The respective end bushings 298 and 304 of each of the shutters is then movably secured by suitably positioned pin members (not shown) which may be mounted about the shuttering device 264, e.g. they may be attached to or may be constituent parts of baffling devices or such associated with the display apparatus. A series of solenoids 310 are then positioned to extend their respective armatures 312 into engagement with a respective one of the lever arms 308 to control one of the Y coordinate shutters 274. Similarly, a plurality of solenoids 314 extend armatures 316 into similar pivotal engagement with lever arms 308 of the X coordinate shutters 272. The X coordinate inputs 318 and the Y coordinate inputs 320 are obtained from the program storage 17 (FIG. 1) as will be described, and the inputs are applied to control respective ones of the solenoids 314 and 310. A single one of X and Y coordinate shutters 272 and 274 are thereby actuated to pass light from a single microfiche frame 244.

While specific description is given the X–Y coordinate visual display and microfiche record, it should be understood that film strip mechanisms are compatible with the teaching method and apparatus and, in some cases, such projection apparatus may be preferred. Several forms of film strip display device which would be easily adaptable into the teaching machine 10 are commercially available from the Recordak Division, Eastman Kodak of Rochester, N.Y. These strip display devices handle rolled microfilm and include rapid linear indexing capability for displaying any selected microfilm frame from the roll. The coding of individual photo frames could be effected in much the same manner as is done for coding squares 252 of microfiche 238. Further, the film strip type of display apparatus carries the attendant possibilities of movie film presentation and such a feature may be desirable for presentation of certain lessons and teaching sequences.

Figure 11:
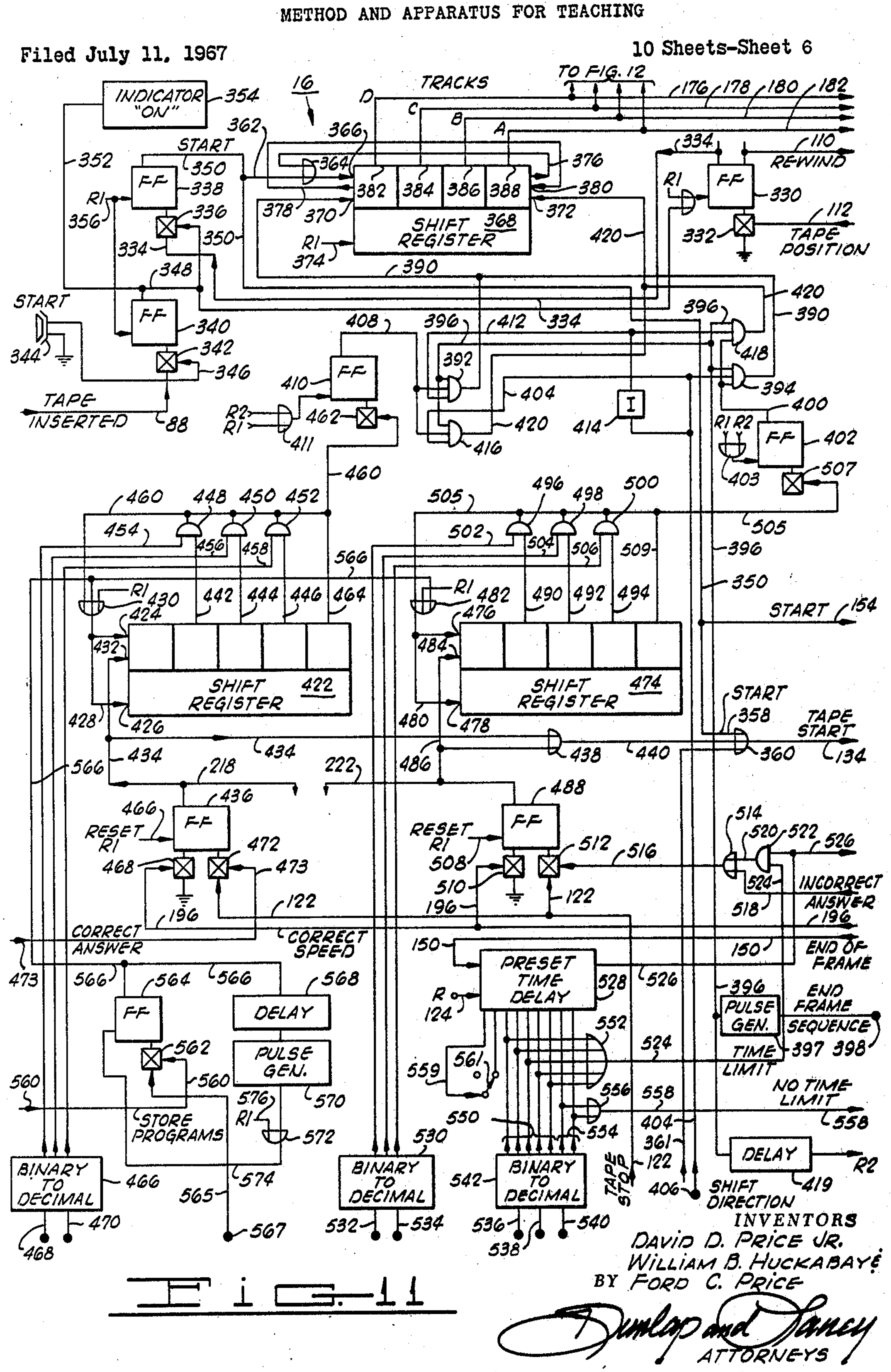
FIG. 11 is a partial schematic diagram of the program control.

FIG. 11 shows circuitry which constitutes essentially the program control 16. Input lines orignating from black dots designate those inputs which orignate from a photocell response, i.e., one of the plurality of photoconductive cells 270 which surround the display screen 268 of the visual display apparatus 12 (FIG. 7). Actually, the number of individual photoresponsive elements 270 may be varied as a matter of design choice, depending upon the type and number of codes employed, but in general the teaching machine constructed in accordance with the present specifications would contain about 98 different code photocells or equivalent indicators.

The system "start" must first be enabled by actuation of a flip-flop 330. Flip-flop 330 is enabled by means of its interlock 332 and proper sense of the "tape position" signal applied on lead 112 and generated in tape playback unit 30 (FIG. 3). If the tape is at a proper or starting position, flip-flop 330 is actuated to produce a "start enable" signal on lead 334 to set the input level to interlock 336 which gates a flip-flop 338. A flip-flop 340, having an interlock or input gate 342, is enabled by a "tape inserted" interlock which sets its input level via lead 88 (FIG. 2) whereupon manual depression of the "start" switch 344 provides actuating pulse indication on lead 346 to interlock 342 to switch flip-flop 340 to its opposite or zero conductive state whereupon an output indication on lead 348 actuates interlock 336 of flip-flop 338 such that its zero state is achieved and "start" pulse activation is present on output lead 350. The output from flip-flop 340 is also connected via lead 352 to an "ON" indicator 354 which is suitably displayed at the operating console. Each of flip-flops 338 and 340 may be reset to the OFF condition by application of the reset R1 energization to input lead 356.

A "start" pulse appearing on lead 350 is applied on lead 154 to enable the playback unit 30 and via lead 358 to an OR gate 360 whereupon the output on lead 134 is applied to start the tape unit as previously described with respect to FIG. 3. The "start" pulse on lead 350 is also applied via lead 362 to an OR gate 364 which passes its output to the set input 366 of a shift register 368. Shift register 368 is a conventional type of four-bit shift register of the backward-forward shifting variety; hence, the shift register 368 has a forward shift input 370, a backward shift input 372 and reset (reset R1) is effected via input 374. Thus, forward set is effected by input 366 from OR gate 364 and the forward cycle command is returned via lead 376 while backward shift cycle command is effected via lead 378 to the backward input 380. An output indication will be present on one of outputs 382, 384, 386 or 388 depending upon the actuation position of shift register 368. The outputs 382–388 convey respective audio record track enabling signals via leads 176–182.

Forward shift of shift register 368 is effected by pulses present on lead 390 from AND gates 392 and 394. Gates 392 and 394 are enabled by an "end of frame sequence" pulse indication on lead 396 from a pulse generator 397 which originates as a code actuation from one of the photoconductive elements 270 (FIG. 7) as denoted by the black dot input 398. AND gate 394 also receives a pulse input on lead 400, the zero output of a flip-flop 402, as well as an input on lead 404 which orginiates at a "shift direction" photocell input 406. AND gate 392 receives additional enabling inputs from lead 408, the zero output from a flip-flop 410, and an input on a lead 412 which is connected through an inverter 414 to the "shift direction" photocell input on lead 404.

An additional pair of gates 416 and 418 provide output on common lead 420 to input 372 to provide backward shift input to shift register 368. AND gates 416 and 418 also receive an enabling input via lead 396, the "end of frame sequence" photocell input at 398 (to actuate pulse generator 397). AND gate 416 is connected to receive input from both the flip-flop output lead 408 and the "shift direction" pulse input on lead 404, while AND gate 418 receives inverted "shift direction" input on lead 412 along with zero conduction output of flip-flop 402. Flip-flops 402 and 410 have their resets connected to OR gates 403 and 411 respectively. OR gates 403 and 411 have two inputs each which receive reset R1 and reset R2, respectively. Reset R2 is derived from a delay 419 which receives an input from pulse generator 397. Delay 419 produces a delayed pulse from the "end of frame sequence" 398.

A shift register 422, a conventional form of 5-bit shift register, provides correct answer shift for tolerance or sequence performance evaluation. The set input 424 and reset input 426 are each connected to lead 428 from OR gate 430. Shift command is applied at input 432 via lead 434 from the zero output of flip-flop 436. Connector 434 is also applied to one input of an OR gate 438, the enabled output 440 being applied through OR gate 360 to the "tape start" circuit 134 which is applied to actuate the tape drive without disturbing the control shift register 160 in FIG. 3.

The second, third and fourth positions of shift register 422 are connected via leads 442, 444 and 446 to inputs of respective AND gates 448, 50 and 52 which also receive a respective tolerance enabling input on leads 454, 456 and 458 to enable an output on lead 460 for application to interlock 462 to actuate flip-flop 410 into its zero conduction state. The lead 460 is also applied through OR gate 430 to set input 424 and reset input 426 to reset shift register 422 back to its one position whenever an output conduction is enabled through the tolerance AND gates 448, 450 or 452. Also, in the event that no AND gate enablement occurs, an output 464 from the fifth and final stage of shift register 422 causes a similar actuation of interlock 462 and reset via OR gate 430.

The tolerance gate inputs on leads 454, 456 and 458 are obtained from a conventional form of binary to decimal converter 466 and its input is derived from binary digital indication present from two code photocell inputs 468 and 470 of the particular photo on display. The tolerance circuit is variable in accordance with the code inputs 468 and 470 for determining the number of correct answers which must be noted in sequence prior to the movement of the student to a different program or a program made up of more or less complex units of the related lesson subject.

The correct answer flip-flop 436 receives reset R1 at input 466 and interlock 468 receives actuation via "correct speed" pulse indication on lead 196 (from FIG. 3) to maintain flip-flop 436 in its "off" attitude whether previously reset or not. An interlock 472 provides actuation of flip-flop 436 upon receiving a level input via "tape stop" lead 122 (from FIG. 3) and a coincident enabling input or "correct answer" pulse indication on a lead 473. The "correct answer" lead originates in the examination control 32 as will be further described below.

An "incorrect answer" shift register 474 provides comparison of wrong answer tolerance with respect to student performance. In the event that wrong answers by a student should exceed the tolerance level, a change to a different record track may occur with regression to a lower or smaller step program, i.e., reduction of the audio playback speed. Shift register 474 is connected in similar manner as the correct answer shift register 422, having set and reset inputs 476 and 478 connected to the output 480 from OR gate 482. Shift command is provided via input 484 and lead 486 from the zero conduction output of "incorrect answer" flip-flop 488. The incorrect actuation on lead 486 is also applied to OR gate 438 and OR gate 360 to enable a "tape start" output on lead 134.

Consecutive outputs 490, 492 and 494 from the respective second, third and fourth stages of shift register 474 are applied to AND gates 496, 498 and 500 along with respective "incorrect answer" tolerance inputs 502, 504 and 506. The output from AND gates 496, 498 and 500 are applied on a lead 505 to an interlock 507 to actuate the flip-flop 402 to its zero conduction state. The output on lead 505 is also connected to an input of OR gate 482 for set/reset of shift register 474 and a recycling output lead 509 provides the similar reset energization from the final or fifth stage output of the shift register 474.

Flip-flop 488 receives reset R1 at input 508 and it is switched off by interlock 510 in response to "correct speed" input on lead 196. An interlock 512 has its input level set by "tape stop" pulse indication on lead 122 and an output from OR gate 514 on lead 516 actuates flip-flop 488 into its zero conduction state. OR gate 514 receives input on a lead 518 which is an "incorrect answer" pulse indication which is sent from the examination control 32 as will be further described. OR gate 514 may also conduct a signal on lead 520 from AND gate 522 upon coincidence of inputs from a "time limit" lead 524 and a lead 526 from preset time delay 528. Thus, the equivalent of an "incorrect answer" is registered via flip-flop 488 and shift register 474 in the event of the students taking an inordinate amount of time to answer as will be further described below.

Incorrect answer tolerance conditioning for a given photo is set into the AND gates 496, 498 and 500 on respective leads 502, 504 and 506 as a pulse output from a conventional form of binary to decimal converter 530. Thus, a binary digital indication of a particular frame tolerance rating appears on input leads 532 and 534, as generated by particular code photocell responses (FIG. 7), and this binary value is converted so that one of leads 502, 504 or 506 may supply a proper enabling voltage to its respective AND gate 496, 498 or 500.

The "time limit" or, as the case may be, the "no time limit" situation is determined in accordance with binary code inputs of 3-bits which exists as the photocell inputs 536, 538 and 540. The three inputs 536–540 are applied to another conventional form of binary-to-decimal converter 542 which provides seven individual outputs to the preset time delay 528. The present time delay 528 receives delay reset R (FIG. 3) on lead input 124 and it is initiated by an actuating input on lead 150 (FIG. 3). After a proper time the preset time delay 528 generates an output pulse indication on lead 526 to enable AND gate 522 as set forth above. The reset R input 124 of preset time delay 528 is the same as that applied at input 96 of preset delay 74 in FIG. 2.

The amount of time which preset time delay 528 will wait prior to generating an output is dependent upon which one of the five leads 550 is energized from binary-to-decimal converter 542. Each of the leads 550 is routed in parallel through OR gate 552 to provide the "time limit" output on lead 524 to the AND gate 522 as previously described. The two remaining leads 554 from binary-to-decimal converter 542 are employed for the "no time limit" condition and they are applied in parallel both to preset time delay 528 and to an OR gate 556 to provide a "no time limit" output on lead 558 for application in the test indicator 50 (FIG. 18) as will be further described. The preset time delay 528 takes the preferred form of a digital counter counting an internal oscillator. Such a preset counter will have a main gate for connecting the internal oscillator to the counter which is actuated by lead 150. The reset 124 will reset the preset time to zero when actuated. A lead 559 from the preset time delay may be interrupted by switch 561 which interrupts the oscillator from the counter input. When the switch is closed once again, the accounting of time is continued. This switch may be operated in cases where the student has a legitimate reason for interrupting the lesson.

A "store programs" pulse input is received on a lead 560 (from FIG. 12 as will be described below) to interlock 562 to actuate a flip-flop 564. This actuation causes zero state conduction on output lead 566 for input to each of the OR gates 430 and 482 which provide set/reset input to the respective 5-bit shift registers 422 and 474. A lead 565 connects the enable portion of gate 562 with a photocell input 567, one of the program photocells 270 (FIG. 7). When photocell 567 is programmed actuated, a signal on lead 565 enables a signal on lead 560 to actuate gate 562. Output on lead 566 is also applied through a minimal delay stage 568 to actuate a pulse generator 570 such that output pulses are applied through an OR gate 572 via lead 574 to reset the flip-flop 564. A reset pulse originating with the main reset of R1 source of FIG. 2 may also be applied via input 576 through OR gate 572 for the similar purpose.

Figure 12:
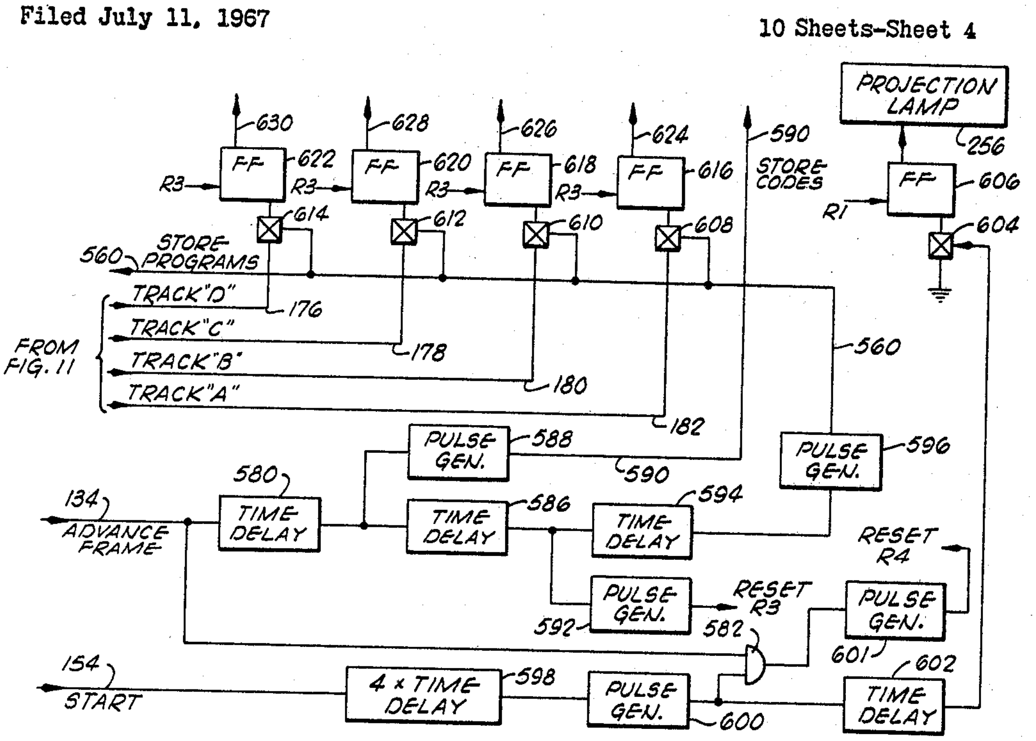
FIG. 12 is a partial schematic diagram of the program storage control circuitry of FIG. 1.

FIG. 12 illustrates schematically the program storage control 22 which is employed for enabling the storage of code programs and the subsequent reading-out of the stored codes from program storage 17. The reset sequencing circuitry of FIG. 12 is initiated by an "advance frame" pulse input 134 which is applied to a first time delay 580, e.g., a monostable multivibrator of conventional time delay design, as well as to an AND gate 582. The output from time delay 580 is applied in parallel to a time delay 586 and a pulse generator 588. The output from pulse generator 588 is applied on lead 590 as the "store codes" pulse which serves to pulse actuate program storage 17 (FIG. 13) as will be described. The output from time delay 586 is then applied to a pulse generator 592 to produce a reset R3 output, and a parallel output from time delay 586 is applied to a succeeding time delay 594 whose output triggers a pulse generator 596 to produce a "store program" pulse on output lead 560.

A "start" pulse on input lead 154 (from FIG. 3) is applied to a time delay 598 which is designed to be at least as long as the sum of time delays 580, 586 and 594 and its output is applied to trigger a pulse generator 600. One output of pulse generator 600 is applied as a coincident input to AND gate 582 to trigger a pulse generator 601 to produce a delayed reset R4, and a parallel output is applied to a time delay stage 602 whereupon its output is employed to interlock 604 to actuate flip-flop 606 such that it energizes the projection lamp 256 (also see FIG. 7).

The "store programs" pulse output on lead 560 is applied to each of interlocks 608, 610, 612 and 614 which control respective flip-flops 616, 618, 620 and 622. Each of the interlocks 608–614 has its input level set by a pulse input from one of the track enabling leads 182, 180, 178 or 176, which pulses represent the track A through D enabling pulses generated in the backward-forward shift register 368 of program control 16 (FIG. 11). As respective ones of flip-flops 616–622 are placed in their zero conductive state by application of a "store programs" pulse on lead 560, an output on one of leads 624, 626, 628 or 630 is conducted to program storage 17 as will be described. Each of flip-flops 616–622 is reset by the delayed reset output R3 from pulse generator 592. The further delayed reset R4 from AND gate 582 is utilized to reset the storage flip-flops in FIG. 13, to be described below.

Figure 13:
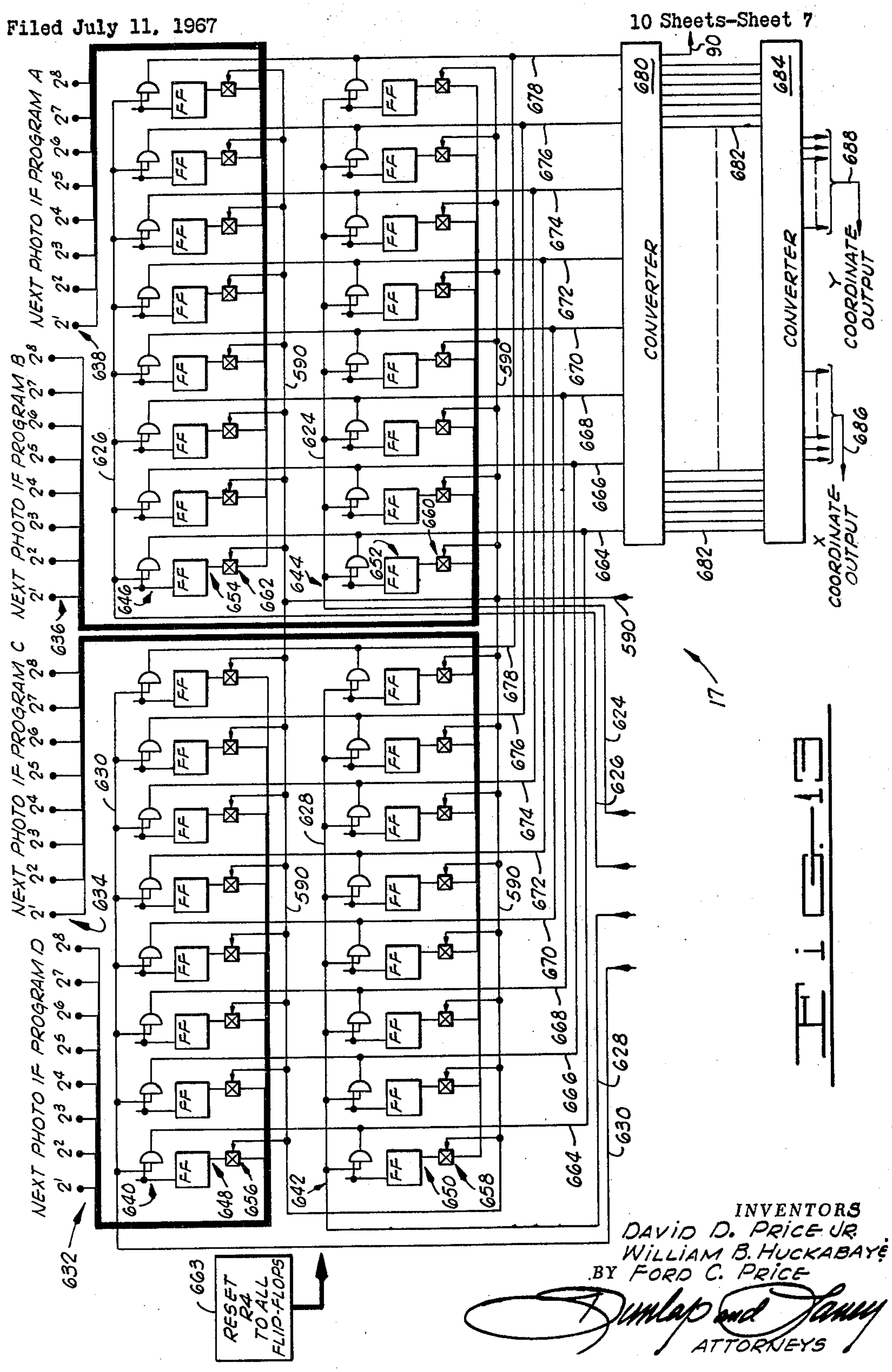
FIG. 13 is a partial schematic diagram of the program storage of FIG. 1.

FIG. 13 illustrates the program storage 17 which receives a plurality of binary code indications for a given microfiche frame which is presently on display in the student's view, the individual code indications being four eight-digit words representative of the next microphoto to be displayed according to the selected tape track A through D. Thus, for a given photo frame, eight photocell code inputs 632 will convey a binary representation in eight digits of the next microphoto frame to be selected if the program control 16 and related circuitry determines that the track D program is the continued or the next succeeding audio track to be used. That is, a selected eight photoresponsive cells 270 (FIG. 7) about the particular photo frame in present view, will provide the eight digit information for the code input 632 of FIG. 13. Similarly, eight-digit photocell code inputs 634, 636 and 638 provide similar binary code inputs for the respective next viewed photos for program of track C, track B and track A.

In accordance with which track, A through D, is actually selected for next operation, one of the four outputs 624–630 is energized in the circuitry of FIG. 12 and this input is conducted to one of the four series of eight AND gates 640, 642, 644 and 646. Each series guards the output circuits of a respective one of the flip-flop storage groups 648, 650, 652 and 654 (eight flip-flops each) and their associated input gates or control interlocks 656, 658, 660 and 662. All flip-flops of the four groups 648–654 are reset by R4 pulse output (FIG. 12) as applied to conventional reset inputs shown generally by block 663.

Thus, for example, in the case where a next projected microphoto must correspond to that for an ensuing track D program, the eight-digit code input 632 is applied to set the level input for each interlocks 656. Each individual digital input is applied to one of the series of eight interlocks 656 in the manner of well-known buffer storage techniques employing plural flip-flop circuits. Once the interlocks 656 have their input levels set, a store codes input on lead 590 to each of interlocks 656 will actuate the conditioned ones of flip-flops 648 to conduct in their zero state to provide a coincidence pulse to associated AND gates 640. The track D enabling pulse on lead 630 to AND gates 640 then allows conduction from the enabled AND gates 640 through the respective leads 664, 666, 668, 670, 672, 674, 676 and 678 which are common to the outputs of all of AND gate groups 640, 642, 644 and 646 to deliver digital output indications to a binary converter 680. Thus, it can be seen that for each microphoto in present view one of the eight digit codes 632–638 will denote the photo for each of the next program tracks and, depending upon the output on leads 624–630 from the program store circuits of FIG. 12, the binary digital code of the selected track will be shifted through one of the storage flip-flop groups 648–654 and emptied into a converter 680 by means of the eight leads 664–678.

The converter 680 may be conventional and commercially available decoder circuit, i.e., it can be any well-known type of diode matrix which accepts the eight binary inputs on leads 664–678 and provides up to 256 individual outputs on one of a plurality of parallel leads 682. The output on selected leads 682 is then applied to the inputs of another converter 684, an X–Y coordinate converter, which may also take the form of a well-known type of diode coordinating matrix. The output from X–Y converter 684 will then be on two leads, one selected lead from each of groups 686 and 688, the respective X and Y coordinate outputs. Actually, the binary input converter 680 and the X–Y converter 684 may be the same matrix, depending upon the number of rows and the number of lines of microphotos which have been selected in designing the microfiche and related display equipment. Also, one output lead from converter 680 may be designated as an "end of lesson" control lead 90 for application to the circuitry of FIG. 2.

Figures 14, 15:
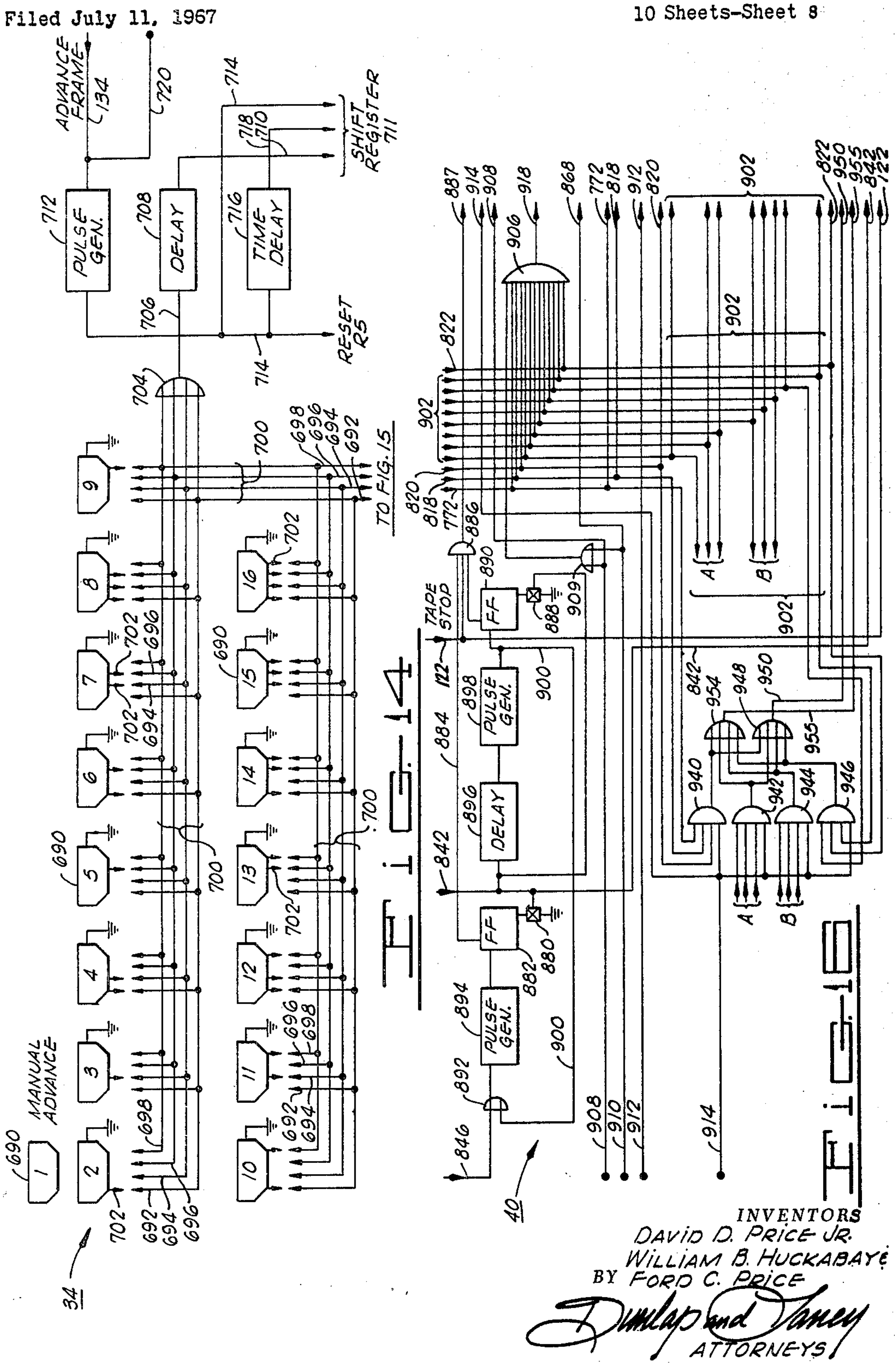
FIG. 14 is a schematic diagram of a response input selector circuitry of FIG. 1.
FIG. 15 depicts the comparator circuitry of FIG. 1 with an interval of repetition denoted by dotted lines.
Figure 15:
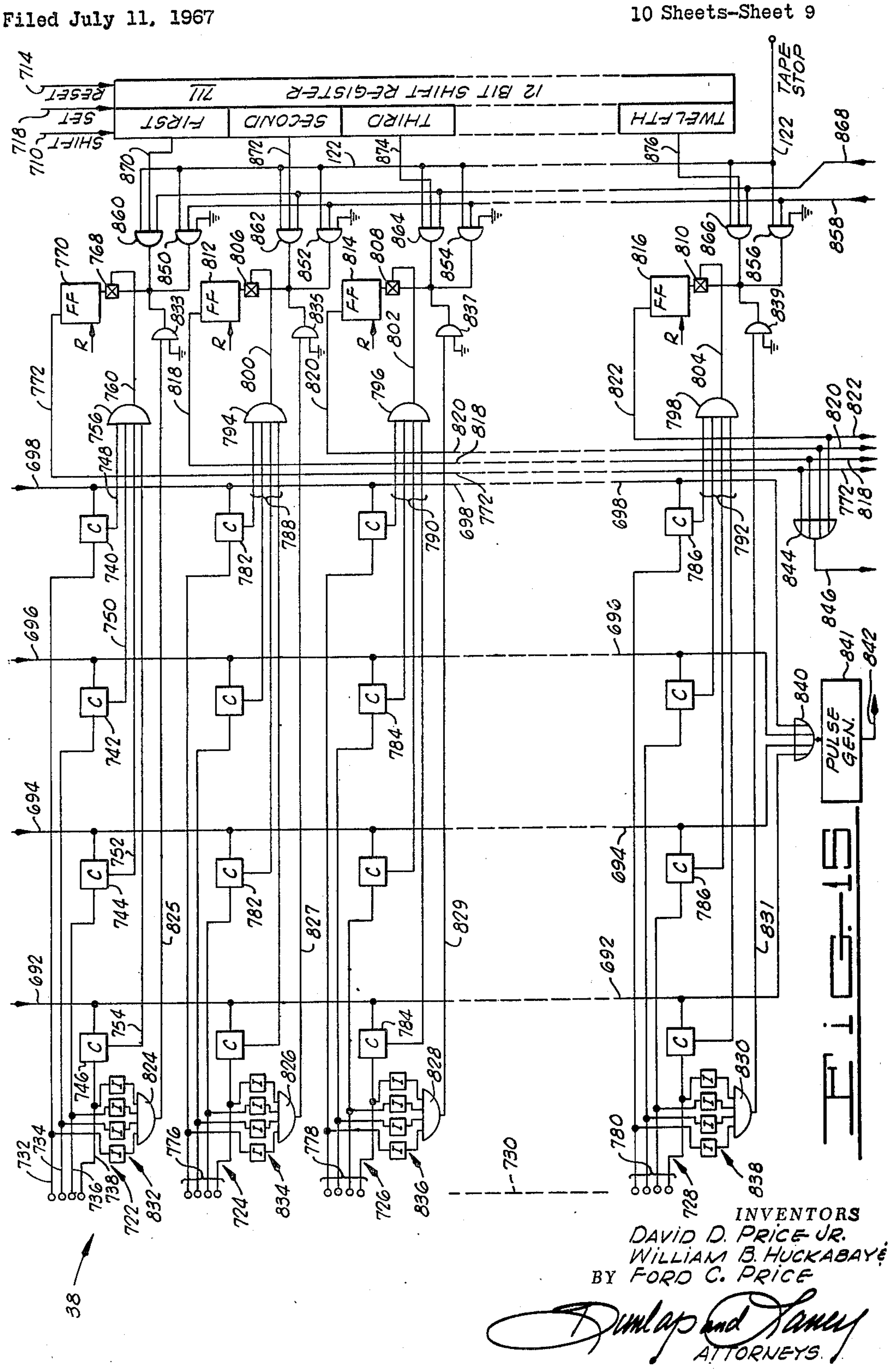

FIG. 14 illustrates the response input selector 34 which consists of a plurality of push buttons 690 which are located on the operating console for actuation by the student for the purpose of entering his various responses. The No. 1 push button 690 is employed for "manual advance" as will be described with respect to FIG. 17. The remaining push buttons 690, Nos. 2 through 16, are each arranged to make a characteristic four lead circuit connection indicative of its binary number representation. In a preferred form, the push buttons 690 each have interlocked lights beneath them and these are extinguished once the button is pushed; thereafter, the "advance frame" enablement is employed to reset or turn on all push button illuminators or lights for the next response phase.

Each of push buttons 690 is provided with a terminal connection to each of four leads 692, 694, 696, and 698 which make up the four lead cable 700 conveying four-bit digital information identifying each of the respective push buttons 690. Each of push buttons 690 has from one to four contact elements 702 which, when the respective push button 690 is depressed, makes grounding or energizing contact with certain ones of the digital leads 700, the digital representation of the number being conveyed by the number and position of contacts versus no contacts detected on the respective leads 692, 694, 696 and 698. Thus, it can be seen that the No. 2 push button 690 has one contact 702 which makes with lead 692, remaining leads 694, 696, 698 being open such that a 1,0,0,0, binary indication is conveyed on the four-lead cable 700. Similarly, and picking a number at random, the push button 690 for No. 7 has two leads 702 which make with the center two conductors 694 and 696, the outer two conductors 692 and 698 remaining open, such that a binary digital indication of 0,1,1,0 is conveyed on cable 700 to identify the No. 7 push button. Each of the various digital response indications on cable 700 is then conducted to the comparator circuitry 38 (FIG. 15) as will be described.

The individual leads of cable 700 conveying the digital bit information are also applied to an OR gate 704 such that the presence of any bit is conducted on lead 706 to a selected delay stage 708 for application on lead 710 as a shift pulse for use in a shift register 711 of FIG. 15 (to be described). Additional set and reset pulses are generated in response to an "advance frame" indication which would originate in the audio control section 28. Thus, an "advance frame" pulse on lead 134 would be passed to a pulse generator 712 for output on lead 714 as a reset R5 pulse indication. The reset R5 pulse is also conducted through a time delay 716 and provided as a set pulse on lead 718 for application to shift register 711. also, a parallel lead 720 is applied to the input of pulse generator 712 and its energization originates at a selected photoresponsive code element 270 (FIG. 7) and provides an "automatic frame advance" control for resetting various circuitry to be described.

FIG. 15 is a portion of examination control 32, the comparator circuitry 38, which receives binary coded digital indications of required responses from selected pluralities of photoresponsive elements 270 (FIG. 7) for comparison with binary coded digital electrical indications originating with the students response by means of the push buttons 690 of FIG. 14. The comparator circuitry 38 comprises a plurality of individual code comparison circuits 722, 724, 726 and 728 each of which may convey a four-bit digital indication identifying a required correct student response. The complete circuitry may include a plurality of code circuits in excess of the four code response circuits 722–728 as denoted by dash lines 730 indicating an interval of repetition, e.g., it has been found preferable in one form of the invention to include twelve such code comparison circuits.

Referring to the comparison circuit 722, a four-bit binary digital input code originating at photoresponsive elements 270 (FIG. 7) may be applied via leads 732, 734, 736 and 738. Each of the leads 732–738 is applied to the input of respective comparator circuits 740, 742, 744 and 746 in coincidence with digital output leads 698, 696, 694 and 692 (cable 700 from FIG. 14) from the response input selector 34. The comparator circuits such as 740–746 may be selected from conventional forms which function to produce an output pulse indication when two identical or matching input signals coincide. An output from any of comparators 740–746 on the respective output leads 748, 750, 752, and 754 are applied to AND gate 756 and a coincidence of all four inputs denoting a code match or correct push button response will allow an output on lead 760 which is then applied to an interlock 768 which provides actuation input to a flip-flop 770.

As flip-flop 770 is actuated to its zero conduction state, its output on lead 772 is conducted to the control gate circuitry 40 of FIG. 16 as will be described. Each of the remaining code identifying circuits 724–728 and any within interval 730 include the same circuitry and each functions identically to that previously described for code identifying circuit 722. Thus, each of identifying circuits 724–728 includes similar four-wire digital bit inputs 776, 778 . . . 780 which originate at separate groups of four photoresponsive elements in the visual display apparatus (FIG. 7) and which are applied to separate one of respective groups of four comparator circuits 782, 784 . . . 786 to provide a plurality of comparator outputs on each group of leads 788, 790 . . . 792 for application to AND gates 794, 796 . . . 798. In the event that a true response is matched through any group of the comparator output circuits 788, 790 . . . 792, the respective AND gates 794, 796 . . . 798 will conduct an output on the respective leads 800, 802 . . . 804 to actuate respective flip-flops 812, 814 . . . 816, thereby generating zero conduction pulse outputs on the respective leads 818, 820 . . . 822.

Each of the four separate inputs of code identifying circuits 722–728 are also applied to the inputs of respective inverters of the four- inverter groups 832, 834, 836 . . . 838 and the respective outputs of each group are applied to AND gates 824, 826, 828 . . . 830. Coincident inputs to one of AND gates 824–830 will allow output on one of leads 825, 827, 829 . . . 831 to respective AND gates 833, 835, 837 . . . 839 to set flip-flops interlocks 768, 806, 808 . . . 810. Energization of the respective flip-flops 770, 812, 814 . . . 816 provides conduction on the respective ones of leads 772, 818, 820 . . . 822. The above energization constitutes a means for voiding a selected one of code identifying circuits 722–728 by merely programming zeros (0,0,0,0,) to actuate the respective one of AND gates 824, 826, 828 . . . 830; that is, it prohibits a 0,0,0,0 code input from effecting an incorrect answer response. An OR gate 840 receives any signal or digital bit pulse present on one of push button leads 692, 694, 696 or 698 and applies its output to energize a pulse generator 841 which provides output on lead 842 as an enabling pulse to the control gate circuitry 40 of FIG. 16 as will be described. Also, an OR gate 844 receives each of the leads 772, 818, 820 . . . 822 (actually twelve inputs in the case of twelve such code identifying circuits) and its output is applied by lead 846 to the control gate circuit 40.

The twelve bit shift register 711 provides a timing enabling circuit for use in certain response pattern control functions. In the event that single question responses are called for, the respective AND gates 850, 852, 854 . . . 856 are employed; these gates are enabled by a "tape stop" signal on lead 122 (from FIG. 3) to each of AND gates 850–856 and a second enabling signal applied on lead 858 (from FIG. 16) allows conduction of the respective AND gates 850–856 to set input levels of the flip-flop interlocks 768 and 806–810. In the event that a particular sequence of responses is required, the further parallel AND gates 860, 862, 864 . . . 866 are enabled to set the input level of the respective interlocks 768 and 806–810. The AND gates 860–866 are also enabled by "tape stop" voltage on lead 122 as well as by an enabling input on lead 868 from FIG. 16 (to be described) and sequential enabling inputs from shift register 711. Thus, after shift register 711 is reset and receives shift command on lead 710 in response to each successive student response actuation (see FIG. 14), the shift register will move from its first through twelfth stages providing successive outputs on respective leads 870, 872, 874 . . . 876 to successively enable the respective AND gates 860–866 and, therefore, interlocks 768 and 806–810.

Figure 16:
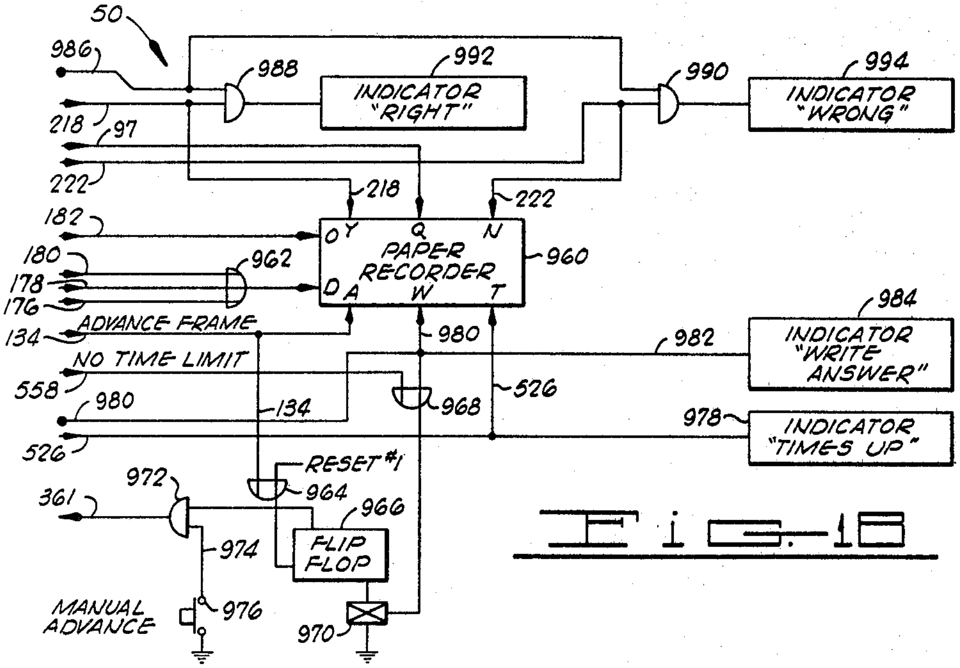
FIG. 16 is a schematic block diagram of a portion of the control gate circuitry of the examination control of FIG. 1.
Figure 17:
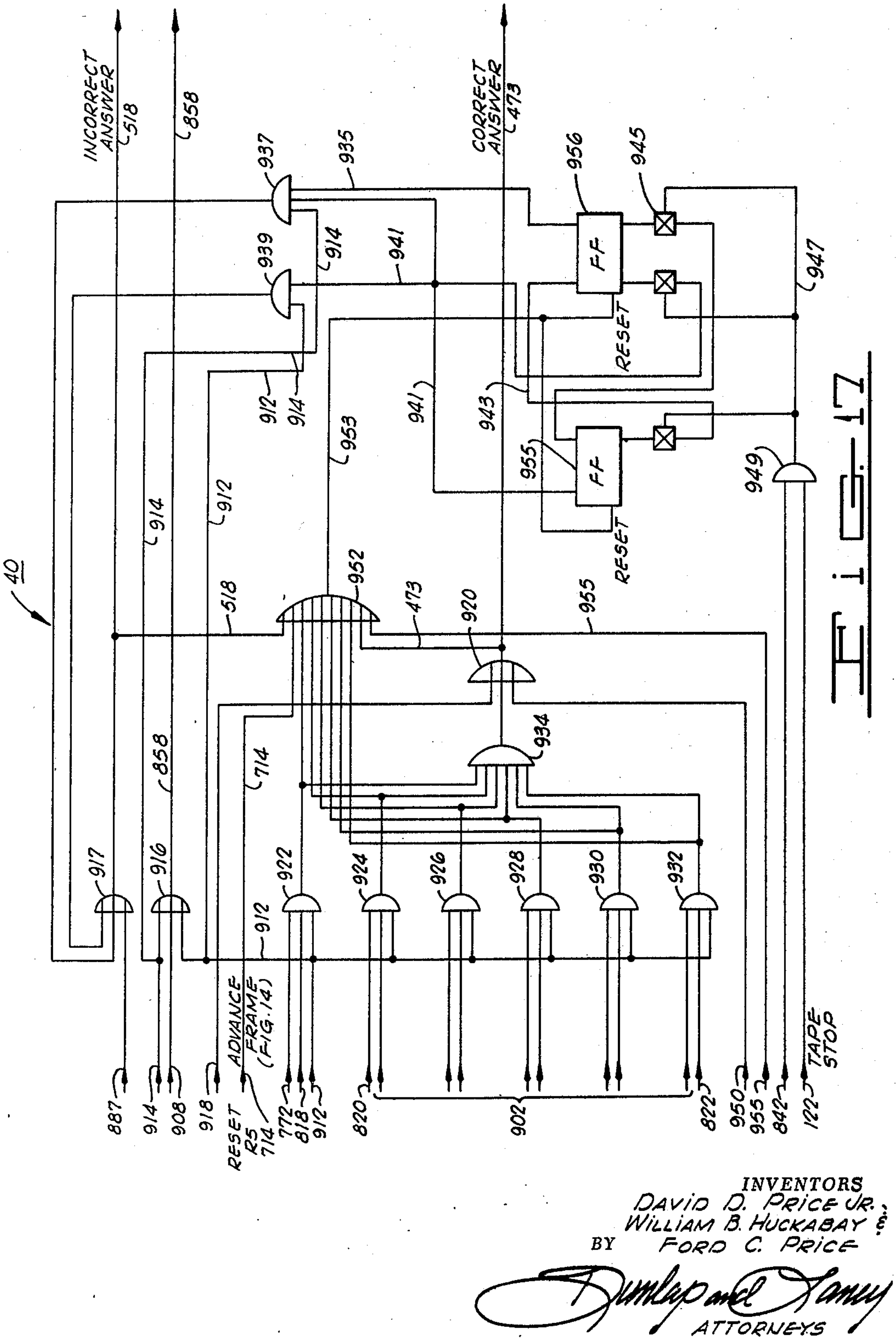
FIG. 17 is a schematic block diagram of the remaining control gate circuitry of the examination control of FIG. 1.

FIGS. 16 and 17 show the control gate circuitry 40 in greater detail. Referring first to FIG. 16, input 842 from OR gate 840 and pulse generator 841 (FIG. 15) provide a pulse input whenever one of push buttons 690 of FIG. 14 is depressed such that application of the pulse to interlock 880 actuates flip-flop 882 to provide an output via 884 to AND gate 886. The pulse on input 842 is also applied to interlock 888 to actuate a flip-flop 890 which also provides an input to AND gate 886. Hence, with application of a "tape stop" pulse from lead 122, the AND gate 886 will conduct an "incorrect answer" pulse output on lead 887 when flip-flop 882 and 890 are actuated in coincidence. However, a correct answer response will provide pulse output on one of leads 772, 818, 820 . . . 822 through OR gate 844 (FIG. 15) to provide an input on lead 846 through OR gate 892 which triggers pulse generator 894 and its output is applied to reset flip-flop 882 to its conductive state thereby avoiding coincident inputs at AND gate 886 controlling incorrect answer output. A delay circuit 896 and serially connected pulse generator 898 provide a reset output on lead 900 which resets both of flip-flops 890 and 882 after each push button response entry.

Outputs from respective flip-flops 770, 812, 814 . . . 816 (FIG. 15), in response to a correct student response which causes a comparator output, will be present on the respective one of leads 772, 818, 820 . . . 822, or one of the group of intermediate leads 902 (eight leads being shown) which were omitted from the FIG. 15 showing to clarify and simplify the presentation. These twelve outputs are then applied to AND gate 906 as well as to various other combinations of control gates (to be described) which may be used to provide different types of answering procedure. That is, the required student's response may take the form of (a) multiple choice of one or more answers, (b) a correct sequence of plural answers, (c) a properly matched pair response, or (d) a properly matched three answer grouping, and these various modes of operation may be enabled by coded photoelectric inputs on the enabling leads 908, 910, 912 and 914 from the display apparatus of FIG. 7. Also, it should be reiterated that whenever any form of answer pattern is programmed into the twelve code identifying circuits 722, 724, 726 . . . 728 (FIG. 15), any identifying circuits not used or filled with code should be set at 0,0,0,0 which is always considered a correct answer or a condition of no effect since it is coincident with none of the push buttons 690 which may be actuated (FIG. 14).

For the case of one or more answers, one or more four digit code circuits (FIG. 15) may be coded for a match with a selected one of the response push buttons 690, and a first photocell response detected at a selected coding position for the particular frame of microphoto will condition input 908 such that its input is applied through OR gate 909 as one enabling input to AND gate 906 as well as through OR gate 916 (FIG. 17) to output lead 858 to enable each of the plurality of AND gates 850–856 (FIG. 15) which set the input levels of interlocks 768–810 for flip-flops 770 and 812–816 (FIG. 15). Any one of the outputs of flip-flops 770 and 812–816 will be applied via leads 772, 818, 820, 822, and the group 902 as enabling inputs to AND gate 906. Thus, with a photocell 270 enabled input on lead 908 and enabling voltage on each of leads 772, 818–822, and group 902, due to either a 0,0,0,0 code program or a correct response to code identifying circuits, AND gate 906 allows a pulse output on lead 918 through OR gate 920 whereupon a "correct answer" pulse is provided on the output lead 473.

Another code photocell actuation on lead 910 can also place an enabling voltage through OR gate 909 to turn on AND gate 906 and a parallel application on lead 868 (FIG. 15) serves to enable each of the AND gates 860–866 which control sequential enablement by the shifting of twelve bit shift register 711. This requires that both leads 908 and 910 may be activated by code response and the examined subject may enter any two or more responses up to twelve as required by the question, a correct answer depending upon a correct sequence of push button actuation. It should be remembered too that in the event that all twelve code inputs are not employed then 0,0,0,0 is always coincident and is used to fill out the program.

A third photocell 270 input on lead 912 may be applied to enable the logic circuitry to require the correct matching of pairs of answers. This will apply to from one to six pairs. The enabling lead 912 is applied to each of the AND gates 922, 924, 926, 928, 930, and 932 (FIG. 17). Each of these respective AND gates 922–932 also receives a separate pair of the twelve flip-flop output leads 722 and 818–822 and the group 902 such that simultaneous enablement of any two leads will provide an output from the respective AND gate 922–932 to similarly enable AND gate 934 to provide a "correct answer" output through the OR gate 920 on lead 473. It will be recalled that remaining AND gates of the group 922–932 which are not enabled particularly by answers will still be enabled by filling out the program with the 0,0,0,0 code of each unused code identifying circuit (722–728 of FIG. 15). The code input or enabling voltage on lead 912 is also applied through OR gate 916 and lead 858 as flip-flop enabling voltage to AND gates 850–856 of FIG. 15.

Finally, the code input lead 914 applies an enabling voltage to each of a series of AND gates 940, 942, 944 and 946 (FIG. 16) which serve to compare three code identifying circuit outputs. Thus, AND gates 940–946 will examine for a proper matched three answer responses which may be present on consecutive three leads of the leads 722 and 818–822 and the lead group 902 as applied to the respective gates 940–946. The output of gates 940–946 is then applied through AND gate 948 and a properly enabled output on lead 950 is applied through OR gate 920 to provide a "correct answer" indication on lead 473. Here again, the AND gate 948 requires an active or affirmative response from each of the previous AND gates such that all code circuits not employed for specifically coded answer functions should be filled out in the 0,0,0,0 program.

In order to ensure acceptance of all multiple choice pair and triad answers with reliable and total rejection of wrong answers, a pair of OR gates 952 and 954 (FIG. 16) are employed with a counter circuit consisting of flip-flops 955 and 956. In the case of answer pairs, the outputs from pair gates 922–932 are also applied in parallel to OR gate 952. Thus, a correct push button selection causes an output through OR gate 952 and lead 953 to reset the counter flip-flops 955 and 956. In the event of a wrong answer push button selection, a push button actuation signal from lead 842 (FIGS. 15 and 16) is applied to AND gate 949, as enabled by "tape stop" signal 122, and output on lead 947 actuates the interlock 945 and flip-flop 956 conducts in the zero conductive state to provide an enabling output on lead 943 to enable the interlock of flip-flop 955. Thus, the next count pulse (button push) on lead 947 actuates flip-flop 955 to its opposite state providing output on lead 941 to AND gate 939. The AND gate 939 is enabled by pairs photocell input 912 to provide an output to OR gate 917 to place an "incorrect answer" output on lead 518. If a "correct answer" is effected prior to completion of the two count of flip-flop 955, an output from OR gate 920, lead 473 and OR gate 952 places an output on lead 953 to reset each of flip-flops 955 and 956 to their starting state. A reset pulse is also present on lead 953 during any "correct answer," "incorrect answer" or "advance frame" by virtue of the leads 473, 518 and 714, respectively, which provide input to OR gate 952.

Similar incorrect push button actuation is provided for the triads circuitry. The code photocell input 914 enables the triads AND gates 940–946 (FIG. 16) and a three count output AND gate 937. Push button depression is tallied by push button actuation pulses on lead 947 as they are applied to actate flip-flops 955 and 956. The third input pulse on lead 947 actuates flip-flop 956 such that a three count output pulse will be present on lead 935 to AND gate 937. The output of AND gate 937 is further enabled by zero conduction of flip-flop 955 and then applied through OR gate 917 and delivered on lead 518 as a valid "incorrect answer" pulse output. The three count may be stopped by a reset signal on lead 953 from OR gate 952 as effected by a "correct answer" button depression, an "incorrect answer," or a "frame advance" pulse (lead 714).

FIG. 18 illustrates the test indicator 50 which may be employed in the present invention. Test indicator 50 is connected directly to the program control 16 (FIG. 11) to record the various student responses and various other pertinent data such as failure to answer in alloted time, written responses, etc. The indicator employs a paper recorder 960 of conventional type which is controlled in response to various testing activities in the teaching machine to keep an accurate record thereof. The paper advance drive of paper recorder 960 is advanced by means of input on lead 134 from FIG. 11. When the tape transport is being driven to reproduce track A, a signal is present on lead 182 and it prints an indication on the paper recorder 960. Combined inputs on leads 176, 178 and 180 (tracks B–D) are passed through an OR gate 962 to print another indication on paper recorder 960.

An "advance frame" signal on line 134, in addition to driving paper recorder 960, is connected to OR gate 964 which serves to reset a flip-kop 966. A "no time limit" input on lead 558 is conducted through an OR gate 968 to interlock 970 to actuate flip-kop 966 to its zero conductive state to enable AND gate 972. Thereafter, a coincident pulse application on lead 974 from the manual advance switch 976 will result in a pulse output on lead 361 for application through OR gate 360 (FIG. 11) as a "tape start" signal.

A "times-up" energization is received in on lead 526 for energization of a suitable indicator 978 which gives notice to the student of the times-up condition. The lead 526 is also applied to paper recorder 960 to record the occurrence of the condition. Also, paper recorder 960 can be adapted to receive a written answer, studants name or such. The write requirement is effected in response to code input at photocell input 980 and a parallel lead 982 is led to a suitable indicator 984 to give a visible indication of the requirement.

The paper recorder 960 also records each right and wrong answer in its proper time sequence relative to the lesson material. This capability is enabled by a code response enablement from one of photocells 270 (FIG. 7) on input lead 986 to enable AND gates 988 and 990 which provide input to a "right" indicator 992 and a "wrong" indicator 994, respectively. Thus, the "correct answer" input 218 originating at the zero conductance output 434 of the "correct answer" flip-flop 436 of FIG. 11 will conduct through AND gate 988 to energize indicator 992. Similarly, in the event of a wrong answer, lead 222 from flip-flop 488 of FIG. 11 is applied through AND gate 990 to energize the "wrong" indicator 994. The respective "right" and "wrong" inputs 218 and 222 are each parallel connected to the respective Y and N inputs of paper recorder 960. Lead 97 from FIG. 2 will print a "*q*" on paper recorder 960 to indicate a "master clear" or "tape inserted" actuation or a time lapse as may appear from preset time delay 74 when the student has quit for some reason.

OPERATION

The teaching machine 10 is energized by closing main power switch 56 and after a predetermined delay in delay circuit 64, a primary or reset R1 pulse is generated on lead 70 for resetting all of the primary bi-stable circuitry. Generation of the reset R1 pulse is also effected by pulse generator 72 in response to an "end of lesson" signal on input lead 90, an interlock signal or lead 88 when a new tape is placed in the teaching machine 10, and when an equipment inactivity exceeding a predetermined time is detected by means of the present counter or time delay 74. The OR gates 80, 82, 84 accept these various control inputs for application to the reset pulse generator 72. Also, a "master clear" switch 92 allows the equipment to be reset or restarted at any time during the teaching cycle.

Teaching machine 10 utilizes lesson materials which exist in the form of plural track audio tape 100 (FIG. 4) and microfiche 238 (FIG. 5), the subject matter of the tape 100 and the visual display microfiche 238 being coordinated in preselected manner. Tape 100 may consist of four record tracks 102–108, tracks D to A, which may be each prerecorded at respective speeds of 1⅞, 3¾, 7½ and 15 inches per second (i.p.s.), depending upon program format, to contain instructional and interrogative information, frame marking signals, and speed reference signals. Thus, tape 100 will be properly placed in the playback unit 30 (FIG. 3) and the microfiche 238 is inserted in the visual display apparatus 12 as shown in FIG. 7. While the described embodiment contemplates substantial program data on the microfiche frame 244, if desired, all such programming data may be placed on the record tape and so stored for control purposes.

In on form, the record tape 100 is designed so that initial lesson material or test frames are run on track D at the slowest tape playback speed of 1⅞ i.p.s. Referring to FIG. 11, flip-flop 330 insures that the record tape 100 is always at a start position by providing both rewind energization and enablement to the starting circuitry in its opposite states. When enabled, start switch 344 energizes a flip-flop 340 which, in turn, energizes start flip-flop 338 to produce a "start" signal on lead 350 for routing throughout the teaching machine 10. The "start" voltage is applied to the audio control 28 of FIG. 3 on lead 154 through OR gate 156 and this serves to set shift register 160 into an initial position whereby the slowest playback output on lead 126 is enabled. Simultaneously, a "tape start" signal is applied on lead 134 to actuate flip-flop 142 to produce a "run" output on lead 124.

Tape playback unit 30 will always start on the lowest speed since shift register 160 enables the tape playback drive serially from lowest to highest speeds as it provides successive outputs on leads 126–132 through OR gate 146 to the interlock 140 of flip-flop 142. Referring again to FIG. 11, a "start" signal on lead 350 is also applied on lead 362 to set shift register 368 to its one state, this also being a track D enablement which is present on lead 176 to enable the output from tape playback unit 30 of FIG. 3. Thus, a track D output on lead 114 coincidental with the track D enabling output on lead 176 from shift register 368 allows the track D audio output to proceed through AND gate 168 on lead 184.

A narrow band width reference signal is selectively conducted through filter 188 and detector 190 and it will attain the desired frequency when the selected track attains proper playback speed. The reference signal must be of a predetermined, constant frequency which when present at its proper playback speed provides a "correct speed" signal at terminal 194. Coincidence of this signal at AND gate 198 allows the audio output on lead 184 to progress through a notch filter 202 (eliminating the reference signal) to the aural output 14 for presentation to the student. "Right" and "wrong" answer indications may be taken from the outputs of flip-flops 436 and 488 of FIG. 11 on leads 218 and 222 to trigger student reinforcement actions in the form of tone signal outputs from oscillators 214 or 216 and these also are applied through aural output 14.

The audio output from AND gate 198 is also applied to a frame end detector 152 which derives a "frame end" signal as applied on lead 150 through OR gate 148 to reset flip-flop 142. This throws flip-flop 142 into its one conductive state providing energization on lead 122 to stop the tape playback unit 30, other "tape stop" output on lead 122 being applied to enable the answer flip-flops 488 and 436 of FIG. 11. Thus, in accordance with the answer given for the previous lesson frame, the shift register 368 (FIG. 11) may be commanded to shift the operation to a different record track and/or either a slower or faster lesson presentation. This will depend upon several factors such as the particular photo code, the tolerance requirement and, primarily, whether the lesson frame end is one which is programmed as a decision or branching point.

By way of example, shift register 368 may be actuated to its second position whereupon track C energization is present on lead 178 to audio control 28 (FIG. 3). Since the tape playback unit 30 was previously reproducing track D and the track C output AND gate 170 is the one which is energized, the track C audio on lead 116 may produce a reference signal on lead 184 which is momentarily at too low a frequency to pass through filter 188, and no "correct speed" gating voltage is present on lead 196. This is due to the fact that the track C reference signal can only actuate the "correct speed" circuitry when the tape is running at a prescribed playback speed.

Thus, in the absence of "correct speed" signal at junction 194 causes an output voltage from inverter 224 in the form of a "change speed" signal on lead 226 through AND gates 228 and 230 to allow the output of reference oscillator 232 to shift the shift register 160 to its No. 2 position, output being enabled on lead 128 to the tape playback unit 30. This then produces a faster drive speed in tape playback unit 30 which allows the track C output on lead 116 through gate 170 to generate the proper frequency of reference signal through filter 188 and detector 190 to produce a "correct speed" signal for application to AND gate 198.

Thus, as far as track changes go, the shift register 368 is a backward-forward type which will enable sequential track changes in either direction in accordance with actuation of the "right" and "wrong" flip-flops 436 and 488 and shift registers 422 and 474 actuated and recycled in accordance with the tolerance inputs as controlled by photoelectric code indications. Track changes may or may not be accompanied by playback speed changes, this would depend upon the lesson format as directed from response data derived from the student's answers. Thus, a lesson track change can be effected by shift register 368 such that one of leads 176–182 will provide a new and different enabling energization. Any track playback speed change in addition to this must derive from the particular frequency of reference signal which is detected from the segment of newly selected track. This provides a capability whereby a slower track receiving good response to lesson material can be sped up to advance to a next frame sequence end or decision point whereupon a track, either the same or different one, can be selected for the next lesson presentation at either the same or a different track playback speed.

FIGS. 5, 6 and 7 show the microfiche 238 in a visual display apparatus 12. The frames 244 of microfiche 238 are arranged in a predetermined pattern and their respective binary code indications will identify each in relation to an audio track and lesson sequence for presentation through shutter assembly 264 and projection optics 266 onto the display screen 268. When first beginning a lesson, a selected No. 1 photo 244 will have an eight digit binary code of 0,0,0,0,0,0,0,0 which will insure that it be first in view. The eight-zero binary code is the same as that which is called for by the reset condition of all of the storage flip-flops 648, 650, 652 and 654 of FIG. 13. Then, as the audio portion of the lesson proceeds, successive "end of frame" signals and program branchings may occur and this changing program requires display of various sequences or successions of photos 244 of microfiche 238. As shown in FIG. 6, each microphoto 244 carries a plurality of code areas 252 about its perimeter and these designate the next photo for viewing in conjunction with whatever audio track A–D is to be used. Each of the code indications 252 is detected by presence or absence of light on one of photocells 270, each of which is individually connected into one of the decoding circuits in the system.

Referring to FIG. 13 thirty-two photoresponses in the form of eight-bit binary indications are stored in flip-flop storage circuitry 648, 650, 652 or 654 depending upon whether the operation is in track A, B, C or D. One eight-bit binary indication is read out in response to "advance frame" information as received in the program storage control 22 of FIG. 12. Referring briefly to FIG. 11, an answer, either right or wrong, causes actuation of one of flip-flops 488 or 436 and a conduction through OR gate 438 and 360 as a "tape start" signal on lead 134. This "tape start" signal is also connected in parallel as an "advance frame" signal (lead 134) and applied to delay and pulse generation circuitry in program storage control 22 (FIG. 12) which carries out both the loading of code into the flip-flops of FIG. 13 and the subsequent reading out of a selected one of the codes, depending upon the track A through D which is in operation at that time.

Thus, following an example where track C has been enabled, a track C input on lead 178 (FIG. 12) will enable a program storage flip-flop 620. An "advance frame" pulse is delayed and applied to pulse generator 588 and the output on lead 590 is a "store codes" pulse which is applied to actuate each of the group of eight flip-flops 648–654 (FIG. 13) in accordance with their respective coded photocell inputs 632–638. A parallel "advance frame" pulse is applied through a further delay and pulse generator 596 (FIG. 12) to provide a "store programs" output on lead 560 which actuates flip-flop 620, previously enabled by track C voltage present on lead 178, to provide conduction on lead 628 to AND gates 642 (FIG. 13) which pass the output from each of the program C flip-flops 650 to empty the binary coded pulse information into binary converter 680 by means of inputs 664–678. An output on selected leads 682 is then applied to the X–Y converter 684 which further breaks the output down into X and Y coordinate outputs on one each of leads 686 and 688.

The output on leads 686 and 688 is then applied to X and Y coordinate actuators 280 and 282 of FIG. 7 to actuate a given X shutter 272 and Y shutter 274 to allow one microphoto for the next sequence of pictures in program C to be projected on display screen 268. Its own unique, multi-digit code will also be projected to fall upon the photoresponsive elements 270 about the perimeter of display screen 268. The sequencing circuitry of FIG. 12 also applies a "start" pulse from lead 154 through a long time delay 598 to energize the projection lamp 256 of the visual display apparatus 12.

As a student response is called for in the lesson presentation, four-bit binary response indications may also be provided in coding squares 252 about the periphery of the particular photoframe of microfiche 238. Thus, the series of up to twelve response codes are received in by means of the photoresponsive four-digit code inputs to the comparator circuitry 38 of FIG. 15. FIG. 15 then constitutes a form of code identifying circuitry which may be actuated by the student's response as put into the system by means of the input selector 38 of FIG. 14. Thus, a plurality of push buttons 690, each of which may be depressed, make selected ones of four contacts in accordance with a predetermined four-digit binary pattern. The binary electrical indication then being present on leads 692–698 (or multi-lead cable 700) for application to FIG. 15 and the plural comparators of code identifying circuits 722–728. A four-digit answer code input, when matched by depression of push button 690 (student response) having the same four-digit binary configuration, may then cause a correct or response verity output for conduction to the control gate circuitry 40 (FIGS. 16 and 17) as will be described.

For example, photocell inputs indicative of a preselected answer code (1,0,1,0) may be detected from selected positions about the microphoto in view and presented on the four leads 732–738 to code identifying circuit 722. The student then may depress, for example, the No. 6 push button which will have the identical four-digit binary code configuration (1,0,1,0) which, when applied on leads 692–698, will cause output conduction from each of comparators 746–740 on leads 754–748 through AND gates 756 and OR gate 762 to actuate flip-flop 770. The output from flip-flop 770, a response verity output, may then be utilized to initiate a "correct answer" response or to fill out a part of such response while awaiting additional response factors (FIGS. 16 and 17). It should be noted that an any program all of the four bit binary inputs to code identifying circuits 722–728 (in this case there are twelve such circuits prescribed) which are not filled with specific answer codes must be filled out with 0,0,0,0 when they are not in use since this is designed to be a not incorrect answer which will actuate the verity output circuitry without effecting "correct answer" recognition. That is, a 0,0,0,0 input will positively actuate the comparators of idle code identifying circuits to actuate their respective flip-flops 812, 814, or 186, etc., to produce enabling verity outputs to the subsequent gating circuits as will be further described.

Thus, referring again to the case of a single answer requirement as input to code identifying circuit 722, the remainder of the code identifying circuits 724–728 will be filled out with 0,0,0,0 such that their respective comparator circuits will actuate the respective flip-flops 812–816 to provide a verity output to leads 818–822, a portion of the multiple enabling outputs to AND gate 906 (FIG. 16). Depression of the correct answer button, i.e., that button 690 which generates the proper four-digit binary response, applies the four digit response indications on leads 692–698 for comparison in comparators 746–740. Since respective digital responses will compare, pulse output is enabled on leads 754–748 through AND gate 756 to actuate flip-flop 770. Verity output from flip-flop 770 is then conducted on lead 772 where it supplies the last remaining enabling input to the AND gate 906 in control gate circuitry 40 (FIG. 16) to thereby allow conduction on lead 918 through OR gate 920 (FIG. 17), the output being a "correct answer" output on lead 473 for application to program control 16 (FIG. 11).

Referring to FIGS. 16 and 17, the previous conduction on leads 772 did not result in an "incorrect answer" output due to the failure of AND gate 886 to be actuated. That is, depression of a push button will cause a pulse indication on at least one of leads 692–698 through OR gate 840, such that a pulse output on 842 will energize flip-flop 882 to provide a first enabling input at AND gate 886. However, the fact that a code comparison was struck to cause actuation of flip-flop 770 and pulse output on lead 772 provides a pulse through OR gate 844 via lead 846 to OR gate 892 to trigger a pulse output from pulse generator 894 and this serves to reset flip-flop 882 and keep it from going to its zero conduction state. For an "incorrect answer" output some one of the push button code contacts will place a triggering pulse on one of leads 692–698 (without comparator energization) and through OR gate 840 via lead 842 to trigger flip-flop 882 and place enabling input at AND gate 886. Simultaneously, the same pulse is applied through a delay 896 and pulse generator 898 to trigger flip-flop 890 and open AND gate 886 thereby to provide an "incorrect answer" output on lead 518. In this wrong answer case, no pulse was generated by one of flip-flops 770 and 812–816 and, therefore, no pulse output was produced through OR gates 844 and 846 to reset the flip-flop 882 prior to the coincidence opening of AND gate 886.

As previously stated, there are various answering modes which may be invoked. The photoelectric code input 908 through OR gate 909 to AND gate 906 enables multiple choice selection of one or more correct answers in any sequence. Code input 910 is applied via lead 868 to twelve bit shift register 711 (FIG. 15) to enable correct sequence answering of two or more questions. In this case, the output on lead 868 is applied to enable respective AND gates 860–866 to actuate flip-flops 770–816 in response to sequential shifting input to shift register 711. Referring to FIG. 14, a shift pulse is provided on lead 710 after delay from the output of OR gate 704 in response to any push button depression which places at least one pulse indication on one of push button leads 692–698. Thus, code identifying circuits 722, 724, 726, etc., can be sequentially energized to fill out the correct sequence of answer comparisons, the remaining code identifying circuits being filled out with 0,0,0,0 binary indication.

Student answers can also be required in pairs and, further, in sequential pairs by code enablement which places a signal on lead 912 to enable each of AND gates 922–932 (FIG. 17) as well as the output OR gate 916. OR gate 916 provides an enabling output on lead 858 to each of the enabling AND gates 850–856 (FIG. 15) which serve to set the input levels to interlocks 768 and 806–810 of flip-flops 770 and 812–816. Consecutive pairs of verity output leads 772 and 818–822 and the group 902 from the flip-flop circuits 770 and 812–816 are applied as inputs to successive AND gates 922–932. Proper verity output response from each successive pair of code identifying circuits 722, 724, 726, etc., will enable outputs from successive ones of AND gates 922–932 to trigger a "correct answer" response through AND gate 934 and OR gate 920 on lead 473.

Teaching machine 10 can also be made to respond in triads, i.e., the apparatus can be made to respond to a correct match of three items or answers and, when using all twelve identifying circuits, the correct answers may be designated as a sequence of up to four groups of three answers. Code input on lead 914 enables each of the AND gates 940–946 in series with AND gate 948 in a manner similar to that previously described for pairs actuation. Thus, a group of three answers can be proven by correct push button response to provide verity output on leads 772 and 818–822 and the group 902 through any of AND gates 940–946 so long as any remaining unused code identifying circuits (722–728 of FIG. 15) are filled out in 0,0,0,0 digital answer code input.

The teaching system includes circuitry for guarding against failure to give an incorrect indication in response to erroneous inputs during pair and triad answer situations. That is, it would be possible to make response input selection for correct buttons in different pairs or triads and no "incorrect answer" would be indicated. Such evasion is prohibited by the counter flip-flops 955 and 956 (FIG. 17) which tally push button actuations up to the number as required by the mode of operation, two or three counts depending upon whether pairs or triads are required, the counters then initiate an "incorrect answer" output if not reset. A reset of flip-flops 955 and 956 may occur in response to "correct answer," a valid "incorrect answer," or a "frame advance." Thus, in the case of a response pairs requirement, any two push button actuations will cause input through AND gate 949 on lead 947 to actuate flip-flops 955 and 956 through two counts whereupon output on lead 941 is conducted by AND gate 939, as enabled by code input 912, through OR gate 917 to provide an "incorrect answer" output on lead 518. Similar output results after a three button tally as the three count one conduction output of flip-flop 956 is conducted by AND gate 937 which has been enabled by triads code input 914.

Referring again to the program control 16 of FIG. 11, the backward-forward shift register 368 serves to shift the audio track in sequence from A to B to C to B, etc., the tracks containing information portions of differing intellectual equivalence. Such shifting of the audio track will take place in accordance with code requirements for the particular lesson as manifested through tolerance level shift registers 422 and 474 in response to the student's correct and incorrect responses which are generated in the right and wrong flip-flops 436 and 488, respectively.

Teaching machine 10 provides for a tolerance input which may be interjected in the consideration of both correct and incorrect student answers to alter the operation of the audio track shifting. That is, in the case of a student's correct answer, a tolerance input derived from selected photoresponsive cells is applied on one of leads 454–458 to enable an AND gate 448–452. This will select a tolerance in that it will set the number of shifts which shift register 422 must experience prior to the passage of an output to trigger the forward flip-flop 410 to generate a shift output on lead 390 and advance shift register 368 such that the audio track advances to a faster speed of increased intellectual equivalence, or a track containing more instruction or information per footage. Thus, it can be seen that five-bit shift register 422 may have its output enabled from the second, third or fourth shift outputs 442–446, depending upon the enabling of AND gates 448–452. The fifth or final stage of shift register 422 may be utilized without an AND gate as the maximum tolerance output.

A similar type of circuitry is employed to set the tolerance which must be abided prior to shifting of the audio track to a loss troublesome or more basic audio track, one which handles the selected intellectual information in more appropriate steps. Another two-bit binary input from selected photoelectric code sources 270 (FIG. 7) is employed to enable one of AND gates 496–500 which will set the tolerance or determine the number of incorrect answers which shift register 474 will tally prior to providing an output to trigger flip-flop 402 such that the register 368 is shifted in the reverse direction, i.e., to a record track of lower intellectual equivalence.

A preset time delay 528 is provided to allow predetermined time periods in which a student registers response. A three-bit binary code derived from selected photoresponsive cells 270 via leads 536–540 is converted such that one of seven output leads is provided to energize the preset time delay 528. The five leads 550 provide inputs for preselected time limits and the parallel output through OR gate 552 is applied on lead 524 through AND gate 522 and OR gate 514 as an incorrect response indication. The remaining two leads 554 from the binary to decimal converter 542 provide an output through OR gate 556 which enables a "no time limit" indication to the test indicator 50 (FIG. 18).

Student reinforcements may be enabled through photocell code response applied on lead 986 (FIG. 18) to enable AND gates 988 and 990. AND gate 988 receives output from the "correct answer" flip-flop 446 (FIG. 11) on lead 218 and applies it as output to the "right" indicator 992. The parallel branch of lead 218 is applied to the paper recorder 960 to record a "right" mark on the record. Similarly, an "incorrect answer" response is present on lead 222 as applied to AND gate 990 to illuminate the "wrong"

indicator 994, the parallel lead 222 being applied to provide "wrong" indication to paper recorder 960.

A written response may be required either to record the student's name or to record certain answers and this may be enabled so that paper recorder 960 will receive the written material while lead 982 energizes a suitable "write answer" indicator 984 as actuated by photocell code input 980. A "times up" indicator 978 receives an input on lead 526 which comes from the preset time delay 528 of FIG. 11 and this is energized after the student has taken more than his prescribed allotment of time prior to indicating any answer.

The foregoing discloses a novel teaching machine which is capable of reacting to the student's responses. The machine can be programmed to exhibit varying tolerances toward acceptance of both right and wrong answers as they effect the machine reactions, and additional student behavioral information such as answering time may be noted and recorded throughout a lesson period. While the equipment is specifically described herein to be constituted of specific component parts and circuitry, it should be understood that various alternatives may be employed. In particular, visual display apparatus of the film strip type may be more advantageously included in the system in some cases, and many types of code and coding devices are contemplated for use in association with the teaching machine.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. An information reproducing machine comprising:
- a plural track information record wherein the information of each track is pre-recorded at a different record speed;
- playback means for reproducing a selected information track;
- selection means controlling said playback means to determine the information track which is reproduced; and
- control means controlling the speed of said playback means in response to the information on the track being reproduced whereby the playback speed is correlated to the pre-recording speed.

2. An information reproducing machine according to claim 1 for use as a teaching machine wherein said information record is an aural record for teaching purposes and each track of said plural track record is adapted for a different learning capability.

3. The teaching machine of claim 2 including:
- response means for generating a student response input, said response means energizing said control means to determine the information track being reproduced.

4. The teaching machine of claim 3 wherein said record is an elongated magnetic recording tape having a plurality of parallel recorded tracks and including a reference signal recorded thereon which is utilized by said control means for controlling the speed of said playback means at one of a plurality of discrete, different speeds.

5. In a teaching machine, the combination of:
- a plural track audio record wherein lesson frames are recorded on the tracks at different speeds and are arranged to physically terminate on the tracks at common branching points;
- playback means for reproducing selected lesson frames from any one of the tracks on the record; and
- means for controlling the speed of said playback means in accordance with a student's response at the conclusion of the presentation of each lesson frame whereby the playback speed is correlated to the speed at which the selected track is recorded.

6. The teaching machine of claim 5 wherein said plural track audio record comprises:
- a record tape having plural tracks of audio information recorded thereon at predetermined different speeds, said tape also having a constant frequency reference signal recorded thereon to provide correct playback speed indication.

7. The teaching machine of claim 6 wherein said playback comprises:
- means responsive to said means for controlling for enabling audio output from one record track, said audio output including playback of a reference signal recorded at a predetermined constant frequency;
- variable speed drive means controlling said record track playback at a speed which reproduces said reference signal at said predetermined frequency.

8. The teaching machine of claim 7 wherein said means for controlling said playback means comprises:
- means for evoking a student response input signal with respect to the particular lesson frame;
- means for generating a reference response input signal with respect to said particular lesson frame;
- means for comparing said student response and reference response input signals to generate a comparison output signal; and
- program control means controlled by input of said comparison output signal to generate a track selection signal for enabling one of the audio output tracks for the next lesson frame.

9. An audio-visual teaching machine, comprising:
- a plural track audio record wherein each audio track contains a series of lesson frames recorded at selected ones of a plurality of different speeds;
- a visual record containing a plurality of frames including visual patterns coordinated with the various audio lesson frames;
- playback means for reproducing one of the various recorded audio lesson frames at a selected one of the plurality of different speeds;
- means for displaying selected visual patterns;
- code sensing means controlled by each visual pattern to generate an output which indicates the next audio lesson frame and visual pattern to be displayed in accordance with the student's response;
- means for generating a student response; and
- means for correlating the student's response with said means associated with each visual pattern to control the playback means and visual display means for presentation of the desired audio and visual information.

10. A teaching machine as set forth in claim 9 which is further characterized to include:
- a reference signal of constant frequency recorded on each of said record tracks;
- frequency selective means receiving a played back reference signal to generate a correct speed signal;
- AND gate means enabled by said correct speed signal to conduct said playback means output including the reference signal;
- notch filter means receiving the output from said AND gate to provide an output of the playback means output while excluding the reference signal; and
- means receiving the filter means output to provide an aural output for presentation to the student.

11. An audio-visual teaching machine comprising:
- a plural track audio record wherein the audio of each track is pre-recorded at a different record speed;
- a visual record containing a plurality of visual patterns;
- playback means for reproducing a selected audio track at a predetermined playback speed which is the same as the pre-recorded speed for the track;
- means for displaying a selected one of said patterns;
- means coordinated with each visual pattern for generating a plurality of code inputs;
- means for generating a student response input; and means receiving said student response input and said code input to control said playback means to reproduce a next selected audio track at a predetermined playback speed, and to control said display means to present a next selected visual pattern.

12. An audio-visual teaching machine as set forth in claim 11 wherein said plural track audio record comprises:

a single record tape having a plurality of juxtaposed recording tracks thereon, each track having frame command signals recorded periodically therealong, and including a reference signal recorded thereon which is utilized by said playback means to control the playback speed.

13. An audio-visual teaching machine as set forth in claim 11 wherein said means coordinated with each visual pattern for generating said code inputs comprises:

an integral, perimetric portion of said visual pattern which contains a plurality of areas which are rendered either transparent or opaque in accordance with predetermined code indications; and photoelectric means generating a code input indicative of each one of said plurality of areas.

14. An audio-visual teaching machine as set forth in claim 13 wherein said means for generating a student response input comprises:

a plurality of push buttons which are normally open, each being depressible to generate a characteristically different binary digital input.

15. An audio-visual teaching machine as set forth in claim 14 which is further characterized to include:

comparator means receiving said binary digital student response input and one of said code inputs to produce an output when the respective inputs compare.

16. An audio-visual teaching machine as set forth in claim 11 wherein said means receiving said student response input and said code input to control said playback means comprises:

control means receiving said student response input and said code input to generate an output signal;

program control means actuated by said control means output signal to control the playback speed and the audio track which is reproduced by said playback means.

17. An audio-visual teaching machine as set forth in claim 16 wherein said means for generating a plurality of code inputs comprises:

a first plurality of photoelectric means for generating a first group of four-bit binary electrical inputs indicative of a correct student response; and a second plurality of photoelectric means for generating a second group of multiple bit binary electrical signals indicative of the next visual pattern to be displayed in coordination with each track of said plural track audio record.

18. An audio-visual teaching machine as set forth in claim 11 wherein said means receiving said student response input and said code input comprises:

first control means receiving said student response input and a correct answer code input to generate a response output signal indicative of either a correct or incorrect response;

program control means receiving said response output signal and generating a student evaluation signal output;

second control means receiving said evaluation signal output to control said means for displaying a next selected one of said visual patterns; and third control means receiving said evaluation signal to control said playback means to reproduce a selected audio track.

19. An audio-visual teaching machine comprising:

an audio record having plural tracks of lesson material recorded thereon at selected ones of plural different speeds;

playback means for reproducing a selected one of said plural tracks of audio at a predetermined playback speed equal to that at which it was recovered;

a visual record of coordinated lesson material in the form of a plurality of photos;

display means for receiving said visual record and projecting a selected one of said photos into view;

coding means providing unique code outputs for each of said plurality of photos, which code outputs identify one or more correct student responses and next photo to be viewed for each selected audio track;

response selector means providing coded outputs indicative of a student's response to the lesson material of said selected audio track and photo;

comparator control means receiving said code outputs and said response selector means outputs to generate a response verity output signal;

examination control means receiving said verity output signal and generating either a correct or incorrect answer output;

program control means enabled by said next photo and generating a student evaluation signal output;

visual control means enabled by said next photo code outputs and actuated by said evaluation signal output to control said display means to show a next selected one of said photos; and audio control means actuated by said student evaluation signal output and controlling and playback means to reproduce a selected one of said plural tracks of audio.

20. An audio-visual teaching machine as set forth in claim 19 wherein said audio record comprises:

an audio recording tape having a plurality of recording tracks juxtaposed therealong, each track containing lesson material recorded thereon at periodically differing plural playback speeds, each track containing a reference signal of predetermined, constant frequency for each of said differing playback speeds, and each track containing periodic lesson frame-end signals.

21. An audio-visual teaching machine as set forth in claim 19 wherein said visual record comprises:

a microfiche containing a plurality of photos disposed in rectangularly coordinated array.

22. An audio-visual teaching machine as set forth in claim 19 wherein said coding means comprises:

a plurality of code locations disposed about each of said photos, each of said unique code outputs being effected by selectively rendering certain ones of said code locations opaque in predetermined code combinations; and a plurality of photoresponsive means each providing an output indicative of the light conductivity of a respective code location.

23. An audio-visual teaching machine as set forth in claim 19 wherein said coding means provides code outputs for each photo and said code outputs are comprised of:

first code outputs of binary electrical outputs representative of the next photo to be viewed in coordination with each audio track; and second code outputs of four-bit binary electrical outputs representing correct student response for questions related to the photo presently in view.

24. An audio-visual teaching machine as set forth in claim 23 wherein said response selector means comprises:

a plurality of normally open push-button means each depressible to generate a plural bit binary electrical output.

25. An audio-visual teaching machine as set forth in claim 24 wherein said comparator control means and examination control means comprise:

plural comparator means each receiving a respective electrical output of said second code outputs at a first comparator input and a respective one of said plural bit binary output signals from one of said push-button means at a second comparator input to generate comparator output in response to a signal input match;

means receiving each of said comparator outputs in coincidence to generate a response verity output signal;

means receiving said verity output signal to generate a first answer output indicative of a correct student response; and means for receiving one of said plural bit binary output signals from said push-button means to generate a second answer output indicative of an incorrect student response.

26. An audio-visual teaching machine as set forth in claim 25 wherein said program control means comprises:

first shift register means which is shifted forward in response to a first shift signal input and backward in response to a second shift signal input;

a second shift register means shiftable forward in response to an input of said first answer output to generate said first shift signal for input to said first shift register means; and third shift register means shiftable forward in response to input of said second answer output from said examination control means to generate said second shift signal for input to said first shift register means.

27. A method audio-visual teaching, comprising the steps of:

recording plural, juxtaposed record tracks of related intellectual data at different selected record speeds such that a differing content of lesson frames per record length may be disposed on the different speed records, each of the record tracks including periodic, simultaneous branching points;

reproducing consecutive lesson frames from a selected one of said plural record tracks; and controlling the record track which is reproduced in accordance with a student response such that different sequences of lesson frames of differing intellectual equivalence are contained uni-directionally along the record tracks.

28. A method of teaching a student by presentation of audio-visual information, comprising the steps of:

storing audio information in plural tracks, each track being a plurality of serially disposed information units recorded at a selected one of a plurality of different recording speeds;

storing related visual information as a plurality of individual images each of which represents a visual information unit;

presenting a selected unit of audio information to the student by playing back the respective track at the speed at which it was recorded;

presenting a unit of related visual information to said student;

causing a student response to said related audio and visual information units; and evaluating said student response to determine which unit of a plurality of succeeding audio units and a related visual information unit will constitute the next presentation to said student, each of said plurality of units containing different amounts of intellectual subject matter.

29. A method as set forth in claim 28 wherein said step of evaluating further comprises:

determining the student response as being one of a first or second type; and controlling the presentation of information units such that determination of a first type of response selects next presentation of an information unit of generally equal intellectual value while determination of a second type of response selects next presentation of an information portion of different intellectual value.

30. A method as set forth in claim 29 wherein said first type of student response results from a correct student response determination and the second type results from an incorrect student response determination.

31. A method as set forth in claim 30 which is further characterized by the steps of:

providing tolerance level selection by predetermining the number of first type responses required to advance a student to next information units of increased intellectual value while predetermining the number of second type responses required to retard a student to next information units of decreased intellectual value.

References Cited

UNITED STATES PATENTS

| | | | |
|---|---|---|---|
| 1,960,094 | 5/1934 | Thurm. | |
| 3,141,243 | 7/1964 | Chapman et al. | 35—9 |
| 3,255,536 | 6/1966 | Livingston et al. | 35—9 |
| 3,273,260 | 9/1966 | Walker | 35—9 |
| 3,395,464 | 8/1968 | Leslie et al. | 35—9 |

EUGENE R. CAPOZIO, Primary Examiner

WILLIAM H. GRIEB, Assistant Examiner

U.S. Cl. X.R.

179—100.2

PO-1050
(5/69)

UNITED STATES PATENT OFFICE
CERTIFICATE OF CORRECTION

Patent No. 3,501,851 Dated March 24, 1970

Inventor(s) David D. Price, Jr., et al

It is certified that error appears in the above-identified patent and that said Letters Patent are hereby corrected as shown below:

In Col. 3, line 45 "more" should be --More--
In Col. 4, line 70 "ciircuitry" should be --circuitry--
In Col. 9, line 11 "orignating" should be --originating--
In Col. 15, line 19 "one" should be --ones--
In Col. 16, line 17 "flip-flop" should be --flip-flops--
In Col. 18, lines 39 and 41 "flip-kop" should be --flip-flop--
In Col, 18, line 52 "studants" should be --students--
In Col. 22, line 41 "186" should be --816--

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents